(12) United States Patent
Moravec et al.

(10) Patent No.: US 9,062,633 B2
(45) Date of Patent: Jun. 23, 2015

(54) PRESSURE BALANCED EXHAUST GAS RECIRCULATION ASSEMBLY FOR A LOCOMOTIVE TWO-STROKE UNIFLOW SCAVENGED DIESEL ENGINE

(75) Inventors: Keith E. Moravec, Downers Grove, IL (US); Gary R. Svihla, Burr Ridge, IL (US); Ajay Patel, Joliet, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 971 days.

(21) Appl. No.: 13/173,094

(22) Filed: Jun. 30, 2011

(65) Prior Publication Data
US 2011/0314797 A1    Dec. 29, 2011

Related U.S. Application Data

(63) Continuation-in-part of application No. 12/848,735, filed on Aug. 2, 2010, now abandoned.

(60) Provisional application No. 61/230,698, filed on Aug. 1, 2009.

(51) Int. Cl.
*F02M 25/07* (2006.01)
*F01N 3/035* (2006.01)

(52) U.S. Cl.
CPC ............ *F02M 25/0707* (2013.01); *F01N 3/035* (2013.01); *F02M 25/0727* (2013.01); *F02M 25/074* (2013.01); *Y02T 10/121* (2013.01)

(58) Field of Classification Search
CPC ....... Y02T 10/121; Y02T 30/30; F01N 3/031; F01N 3/033; F01N 3/035
USPC ............... 123/568.11, 568.12, 568.21, 559.1, 123/559.2, 563, 564, 565; 60/278, 279, 60/605.2; 701/108
See application file for complete search history.

(56) References Cited

U.S. PATENT DOCUMENTS

| | | | |
|---|---|---|---|
| 7,052,532 B1 * | 5/2006 | Liu et al. | 96/154 |
| 7,299,793 B1 * | 11/2007 | Tyo et al. | 123/568.12 |
| 7,406,879 B2 * | 8/2008 | Adams et al. | 73/861.52 |
| 7,512,479 B1 * | 3/2009 | Wang | 701/103 |

(Continued)

*Primary Examiner* — Hieu T Vo
*Assistant Examiner* — Arnold Castro
(74) *Attorney, Agent, or Firm* — Miller, Matthias & Hull LLP

(57) ABSTRACT

A two-stroke uniflow scavenged diesel engine system including an exhaust gas recirculation (EGR) system is described for reducing $NO_X$ emissions and achieving desired fuel economy by recirculating exhaust gas through the engine. More specifically, the present invention is directed to a pressure balance exhaust gas recirculation (EGR) assembly for a two-stroke locomotive diesel engine having an EGR system. The present pressure balance EGR assembly includes an EGR module adapted to define a space between the external housing wall of the DOC housing and the inner wall of the EGR module housing and a space between the external wall of the DPF housing and the inner wall of the EGR module housing. One side of each space is confined by a flange-gasket arrangement, whereas the other side of the space is in open communication with the outlet of the respective DOC or DPF such that a portion of the exhaust fills each space. As a result of this configuration, pressure between each space and the pressure in the DOC or DPF, respectively, are about equal. As a result, internal exhaust pressure which the DOC and DPF components are subjected to is balanced by the external pressure provided by the present disclosure arrangement.

15 Claims, 20 Drawing Sheets

(56) References Cited

U.S. PATENT DOCUMENTS

| | | | |
|---|---|---|---|
| 7,673,448 B2* | 3/2010 | Voss et al. | 60/297 |
| 2005/0103013 A1* | 5/2005 | Brookshire et al. | 60/605.2 |
| 2005/0284137 A1* | 12/2005 | Son | 60/295 |
| 2006/0051273 A1* | 3/2006 | Son | 423/215.5 |
| 2006/0124115 A1* | 6/2006 | Brookshire et al. | 123/568.12 |
| 2006/0144374 A1* | 7/2006 | Nishimura et al. | 123/568.16 |
| 2006/0162318 A1* | 7/2006 | Aida et al. | 60/280 |
| 2006/0277900 A1* | 12/2006 | Hovda et al. | 60/299 |
| 2007/0068157 A1* | 3/2007 | Kurtz | 60/605.2 |
| 2009/0194079 A1* | 8/2009 | Nagae et al. | 123/568.11 |
| 2009/0277431 A1* | 11/2009 | Nitzke et al. | 123/568.12 |
| 2010/0050631 A1* | 3/2010 | Yager | 60/604 |
| 2011/0048001 A1* | 3/2011 | Nagae | 60/605.2 |
| 2011/0061380 A1* | 3/2011 | Leroux et al. | 60/605.2 |
| 2011/0099978 A1* | 5/2011 | Davidson et al. | 60/274 |
| 2011/0113755 A1* | 5/2011 | Kim | 60/275 |
| 2011/0114066 A1* | 5/2011 | Vasallo et al. | 123/564 |
| 2011/0138794 A1* | 6/2011 | Yamamoto | 60/311 |
| 2011/0192671 A1* | 8/2011 | Mitsuda et al. | 180/309 |
| 2012/0048216 A1* | 3/2012 | Tomazic et al. | 123/3 |

\* cited by examiner

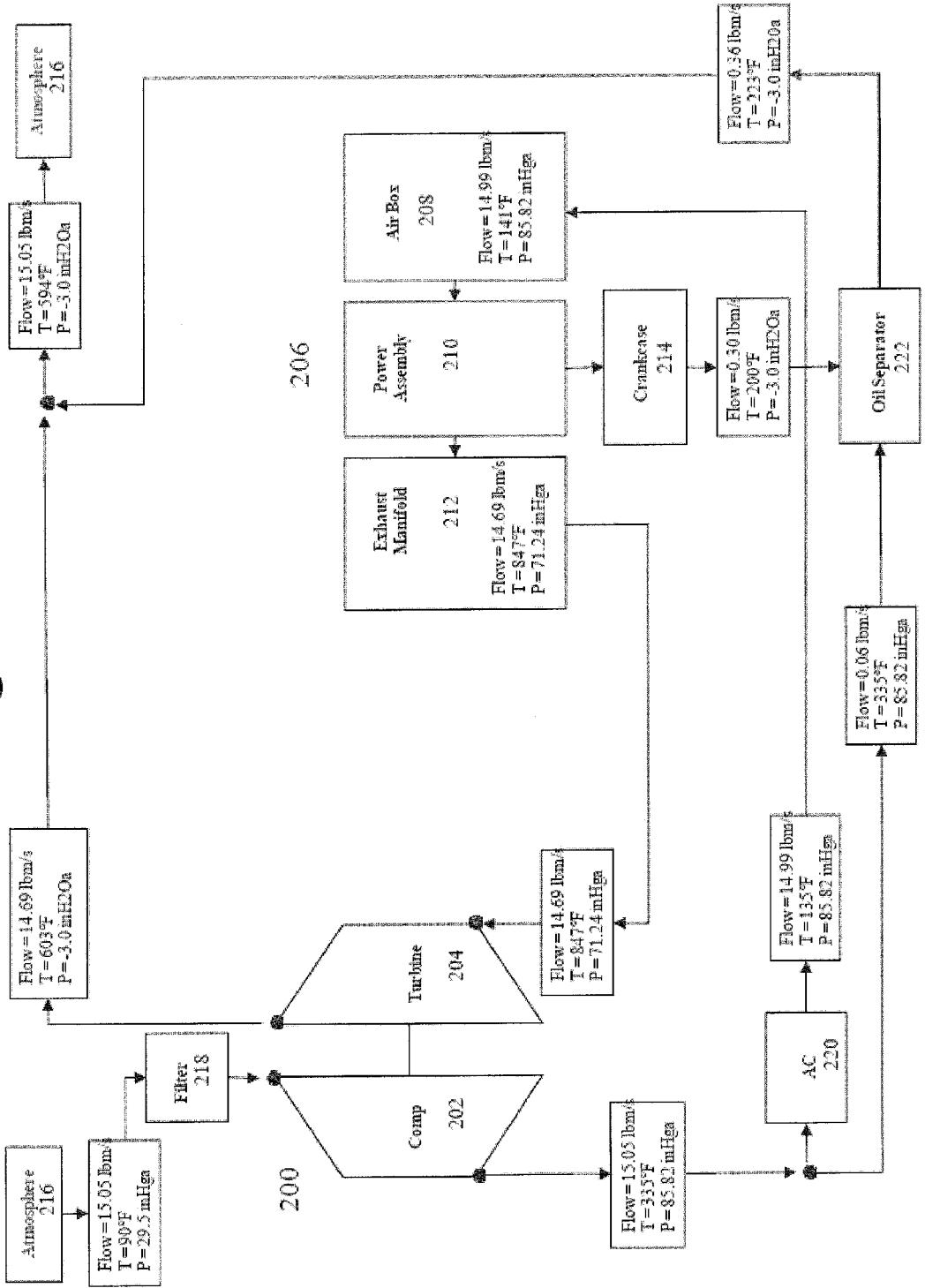

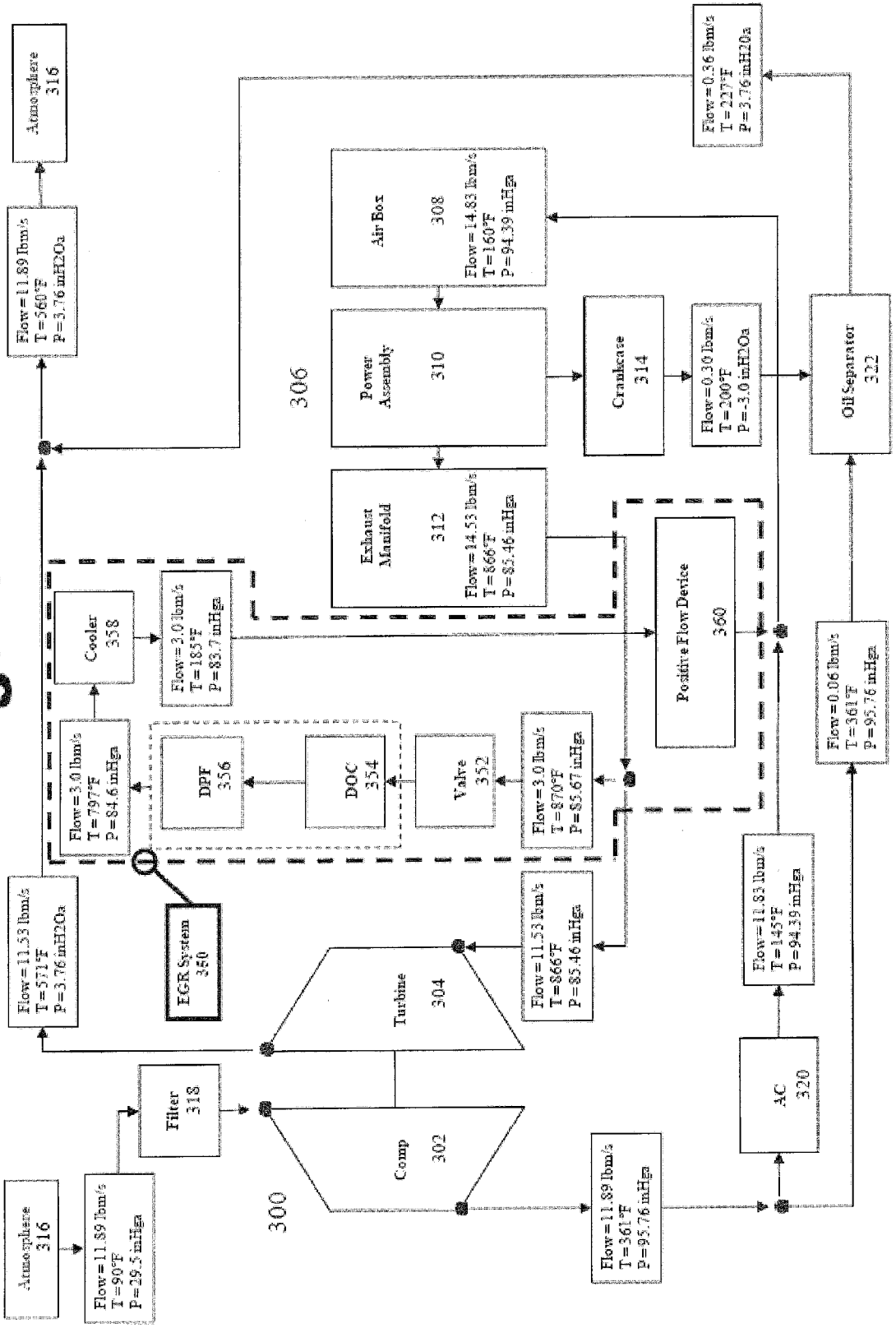

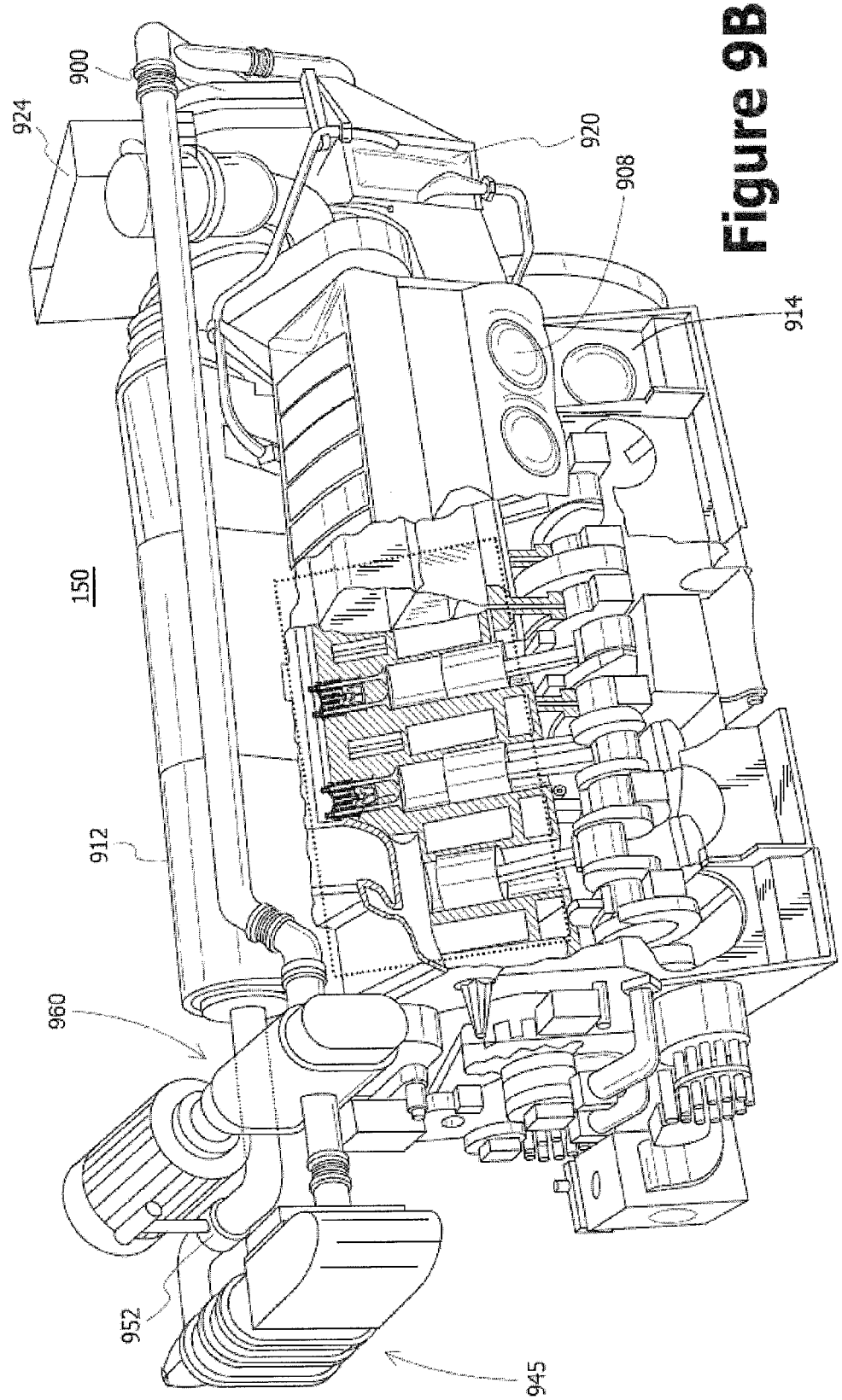

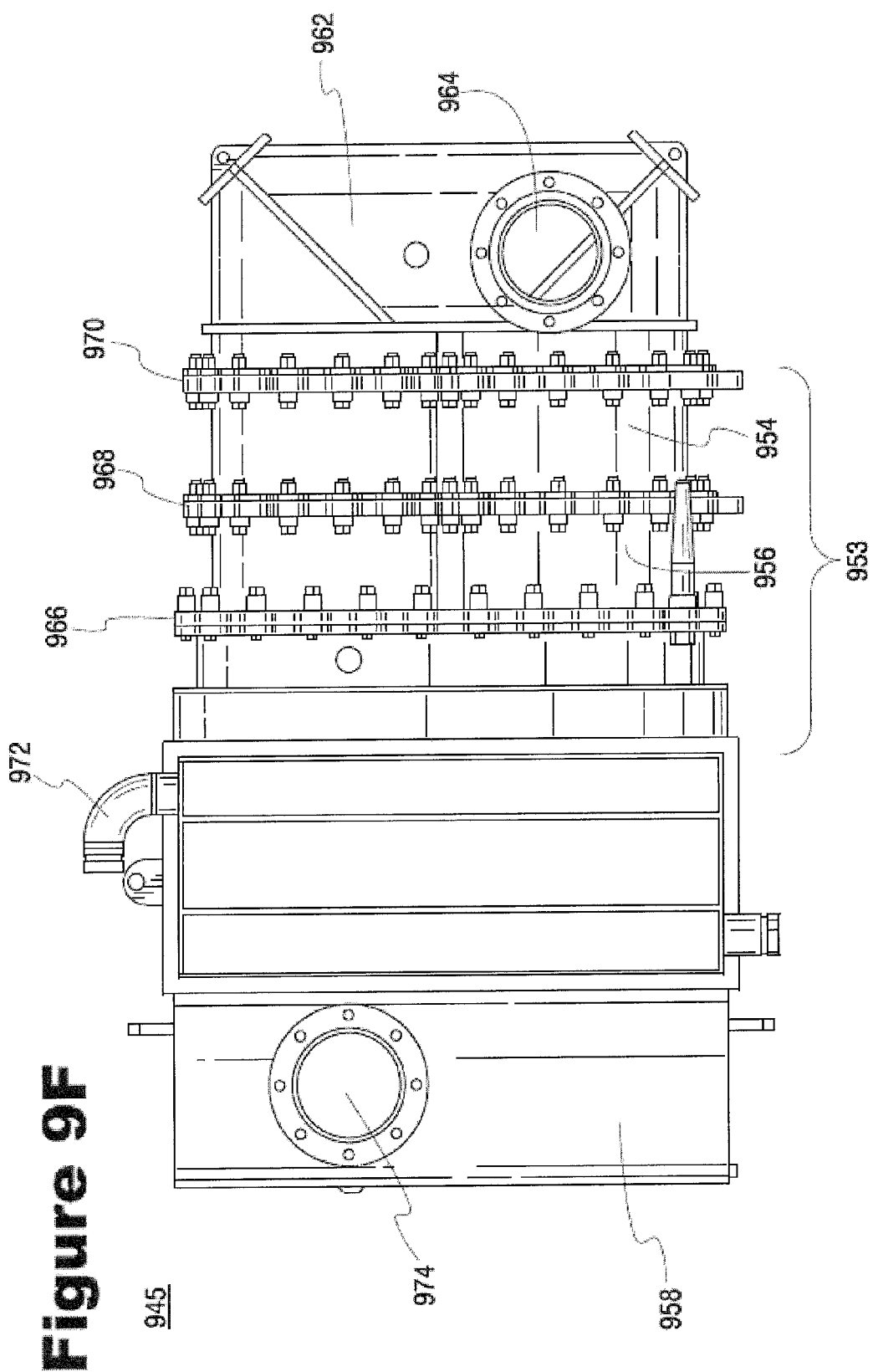

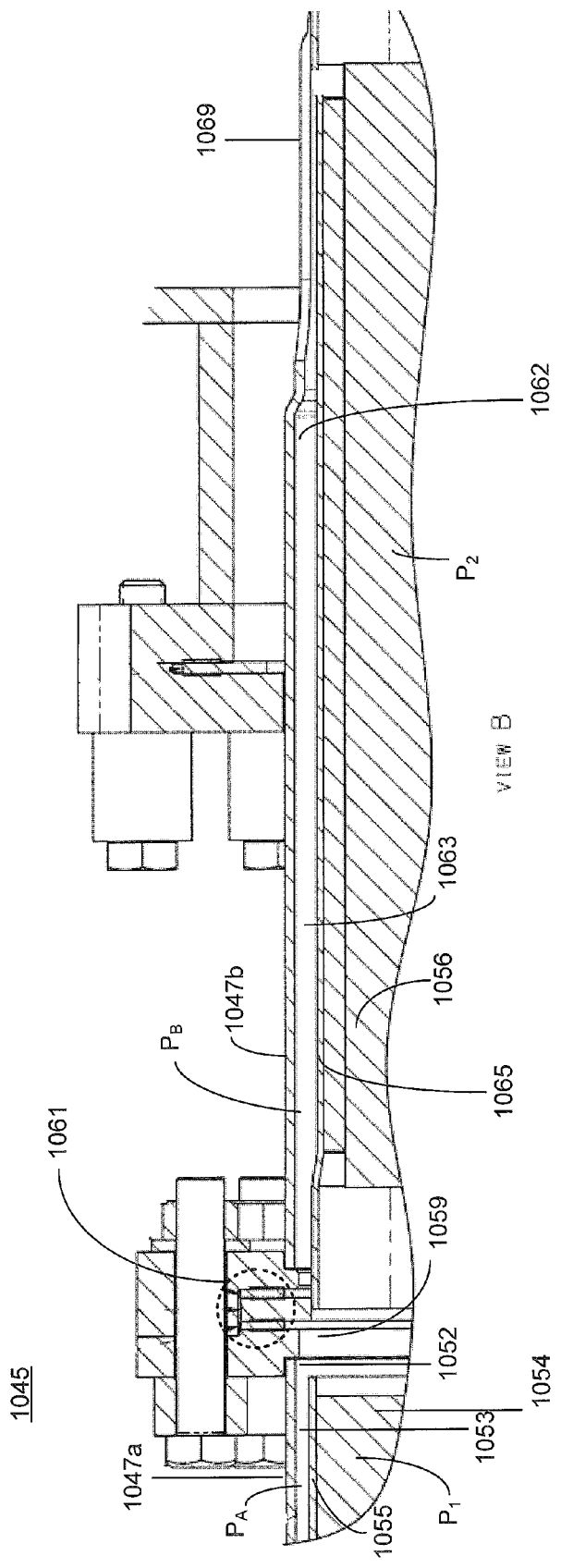

PRESSURE BALANCED EXHAUST GAS RECIRCULATION ASSEMBLY FOR A LOCOMOTIVE TWO-STROKE UNIFLOW SCAVENGED DIESEL ENGINE

CROSS-REFERENCE TO RELATED APPLICATIONS

This application is a Continuation-in-part patent application, claiming the benefit under 35 U.S.C. §120, of U.S. Nonprovisional application Ser. No. 12/848,735, entitled "Exhaust Gas Recirculation System for a Locomotive Two-Stroke Uniflow Scavenged Diesel Engine," filed Aug. 2, 2010, which claims benefit to U.S. Provisional Application Ser. No. 61/230,698, entitled "Exhaust Gas Recirculation System for a Locomotive Two-Stroke Uniflow Scavenged Diesel Engine," filed Aug. 1, 2009, the complete disclosure thereof being incorporated herein by reference.

BACKGROUND OF THE INVENTION

The present invention generally relates to a locomotive diesel engine and, more specifically, to a pressure balanced exhaust gas recirculation ("EGR") assembly for a locomotive diesel engine having an EGR system. The present invention EGR assembly may be implemented in a locomotive two-stroke uniflow scavenged diesel engine.

FIG. 1 illustrates a locomotive 100 including a conventional uniflow two-stroke diesel engine system 150. As shown in FIGS. 2a and 2b, the locomotive diesel engine system 150 of FIG. 1 includes a conventional air system. Referring concurrently to both FIGS. 2a and 2b, the locomotive diesel engine system 150 generally comprises a turbocharger 200 having a compressor 202 and a turbine 204 which provides compressed air to an engine 206 having an airbox 208, power assemblies 210, an exhaust manifold 212, and a crankcase 214. In a typical locomotive diesel engine system 150, the turbocharger 200 increases the power density of the engine 206 by compressing and increasing the amount of air transferred to the engine 206.

More specifically, the turbocharger 200 draws air from the atmosphere 216, which is filtered using a conventional air filter 218. The filtered air is compressed by a compressor 202. The compressor 202 is powered by a turbine 204, as will be discussed in further detail below. A larger portion of the compressed air (or charge air) is transferred to an aftercooler (or otherwise referred to as a heat exchanger, charge air cooler, or intercooler) 220 where the charge air is cooled to a select temperature. Another smaller portion of the compressed air is transferred to a crankcase ventilation oil separator 222 which evacuates the crankcase 214 in the engine; entrains crankcase gas; and filters entrained crankcase oil before releasing the mixture of crankcase gas and compressed air into the atmosphere 216.

The cooled charge air from the aftercooler 220 enters the engine 206 via an airbox 208. The decrease in charge air intake temperature provides a denser intake charge to the engine which reduces $NO_X$ emissions while improving fuel economy. The airbox 208 is a single enclosure, which distributes the cooled air to a plurality of cylinders. The combustion cycle of a diesel engine includes what is referred to as scavenging and mixing processes. During the scavenging and mixing process, a positive pressure gradient is maintained from the intake port of the airbox 208 to the exhaust manifold 212 such that the cooled charge air from the airbox 208 charges the cylinders and scavenges most of the combusted gas from the previous combustion cycle.

More specifically, during the scavenging process in the power assembly 210, the cooled charge air enters one end of a cylinder controlled by an associated piston and intake ports. The cooled charge air mixes with a small amount of combusted gas remaining from the previous cycle. At the same time, the larger amount of combusted gas exits the other end of the cylinder via four exhaust valves and enters the exhaust manifold 212 as exhaust gas. The control of these scavenging and mixing processes is instrumental in emissions reduction as well as in achieving desired levels of fuel economy.

Exhaust gases from the combustion cycle exit the engine 206 via an exhaust manifold 212. The exhaust gas flow from the engine 206 is used to power the turbine 204 of the turbocharger 200, and thereby the compressor 202 of the turbocharger 200. After powering the turbine 204 of the turbocharger 200, the exhaust gases are released into the atmosphere 216 via an exhaust stack 224 or silencer.

The exhaust gases released into the atmosphere by a locomotive diesel engine include particulates, nitrogen oxides ($NO_X$) and other pollutants. Legislation has been passed to reduce the amount of pollutants that may be released into the atmosphere. Traditional systems have been implemented which reduce these pollutants, but at the expense of fuel efficiency. Accordingly, it is an object of the present invention to provide a system which reduces the amount of pollutants released by the diesel engine while achieving desired fuel efficiency. It is a further object of the present invention to provide an EGR system for a uniflow two-stroke diesel engine, which manages the aforementioned scavenging and mixing processes to reduce $NO_X$ while achieving desired fuel economy.

As described with regard to the various aspects of the present invention, emissions reduction may be achieved by recirculating some of the exhaust gas back through the engine. Major constituents of exhaust gas that are recirculated include $N_2$, $CO_2$, and water vapor, which affect the combustion process through dilution and thermal effects. The dilution effect is caused by the reduction in the concentration of oxygen in intake air. The thermal effect is caused by increasing the specific heat capacity of the charge.

Because flow of exhaust gas through the EGR system depends on internal pressure therein, it is important that internal pressure be high. However, if the internal pressure of certain EGR system parts becomes higher than the external pressure of those parts, the internal pressure will cause deformation to the system housing. Therefore, it is an object of the present invention pressure balance EGR assembly to equalize internal pressure across the EGR system and prevent deformation of EGR system parts.

The various embodiments of the present invention EGR system are able to exceed what is referred in the industry as the Environmental Protection Agency's (EPA) Tier II (40 CFR 92) and Tier III (40 CFR 1033) $NO_X$ emission requirements, as well as the more stringent European Commission (EURO) Tier IIIb $NO_X$ emission requirements. These various emission requirements are cited by reference herein and made a part of this patent application.

Locomotives must also be able operate within specific length, width, and height constraints. For example, the length of the locomotive must be below that which is necessary for it to negotiate track curvatures or a minimum track radius. In another example, the width and height of the locomotive must be below that which is necessary for it to clear tunnels or overhead obstructions. Locomotives have been designed to utilize all space available within these size constraints. Therefore, locomotives have limited space available for adding new system components thereon. Accordingly, it also an object of the present invention to provide a system, which may be placed within the limited size constraints of the locomotive and preferably within the same general framework of an existing locomotive.

SUMMARY OF THE INVENTION

In accordance with an embodiment of the invention, a two-stroke uniflow scavenged diesel engine system including an exhaust gas recirculation (EGR) system is described for reducing $NO_X$ emissions and achieving desired fuel economy by recirculating exhaust gas through the engine. More specifically, the present invention is directed to a pressure balance exhaust gas recirculation (EGR) assembly for a two-stroke locomotive diesel engine having an EGR system.

The engine system generally comprises a turbocharger adapted to compress fresh air and a two-stroke uniflow scavenged diesel engine having a power assembly with an inlet for receiving at least compressed fresh air from the turbocharger and recirculated exhaust gas for combustion and delivering at least some exhaust gas resulting from combustion to an exhaust manifold. The engine has a positive pressure gradient between the inlet of the power assembly and the exhaust manifold to achieve desired levels of scavenging and mixing of compressed fresh air from the turbocharger, recirculated exhaust gas and combusted gas from a previous combustion cycle in the power assembly.

The engine system further includes an EGR system having a flow regulating device and a cooler. The flow regulating device (e.g., a valve or positive flow device) is adapted to direct a select portion of the exhaust gas to be recirculated to the engine system. The cooler is coupled to the flow regulating device for decreasing the temperature of the exhaust gas, whereby the flow regulating device controls the flow of cooled exhaust gas to be recirculated such that another positive pressure gradient is achieved for introducing the select portion of exhaust gas to be recirculated into the engine system. The EGR system may further include a filtration system for filtering particulate matter from the select portion of exhaust gas to be recirculated. The filtration system preferably includes a diesel oxidation catalyst and a diesel particulate filter.

The present pressure balance EGR assembly includes an EGR module adapted to define a space between the external housing wall of the DOC housing and the inner wall of the EGR module housing and a space between the external wall of the DPF housing and the inner wall of the EGR module housing. One side of each space is confined by a flange-gasket arrangement, whereas the other side of the space is in open communication with the outlet of the respective DOC or DPF such that a portion of the exhaust fills each space. As a result of this configuration, pressure between each space and the pressure in the DOC or DPF, respectively, are about equal. As a result, internal exhaust pressure which the DOC and DPF components are subjected to is balanced by the external pressure provided by the present disclosure arrangement.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

BRIEF DESCRIPTION OF THE DRAWINGS

FIG. 2B is a system diagram of the two-stroke diesel engine system of FIG. 2 having a conventional air system.

FIG. 3 is a system diagram of the two-stroke diesel engine system having an EGR system in accordance with an embodiment of the present invention.

FIG. 9B is a partial cross-sectional perspective view of the two-stroke diesel engine system with an EGR system of FIG. 9A.

FIG. 9F is a side view of the EGR module of FIG. 9E.

FIG. 10C is a cut-away sectional view of the embodiment of FIG. 10B.

DETAILED DESCRIPTION OF THE PREFERRED EMBODIMENTS

The present invention system is directed to a pressure balance exhaust gas recirculation (EGR) assembly for a locomotive diesel engine including an EGR system to reduce pollutants, and namely $NO_X$ emissions released from the engine. Specifically, the EGR assembly includes an EGR module comprising a cooler, filtration system and a positive flow device. The present invention pressure balanced EGR assembly equalizes pressure across the EGR module in order to prevent deformation and failure thereof.

Figure 1:
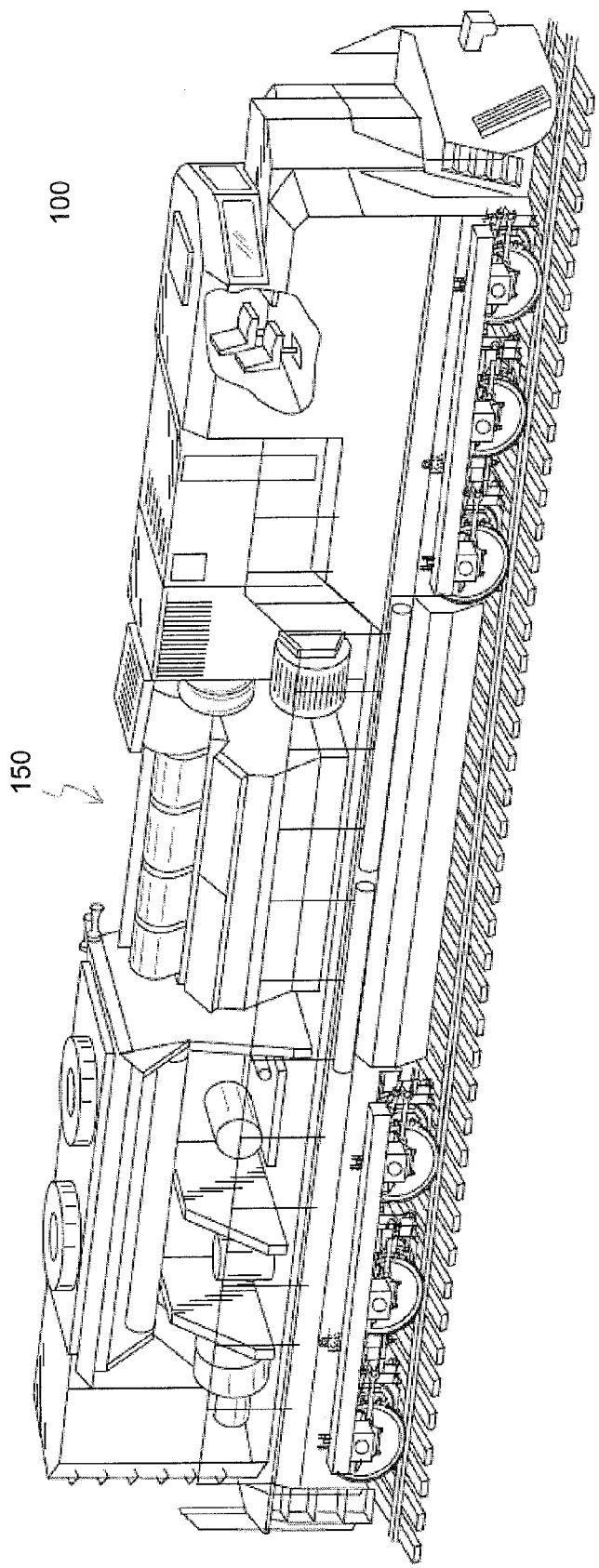
FIG. 1 is a perspective view of a locomotive including a two-stroke diesel engine system.
Figure 2A:
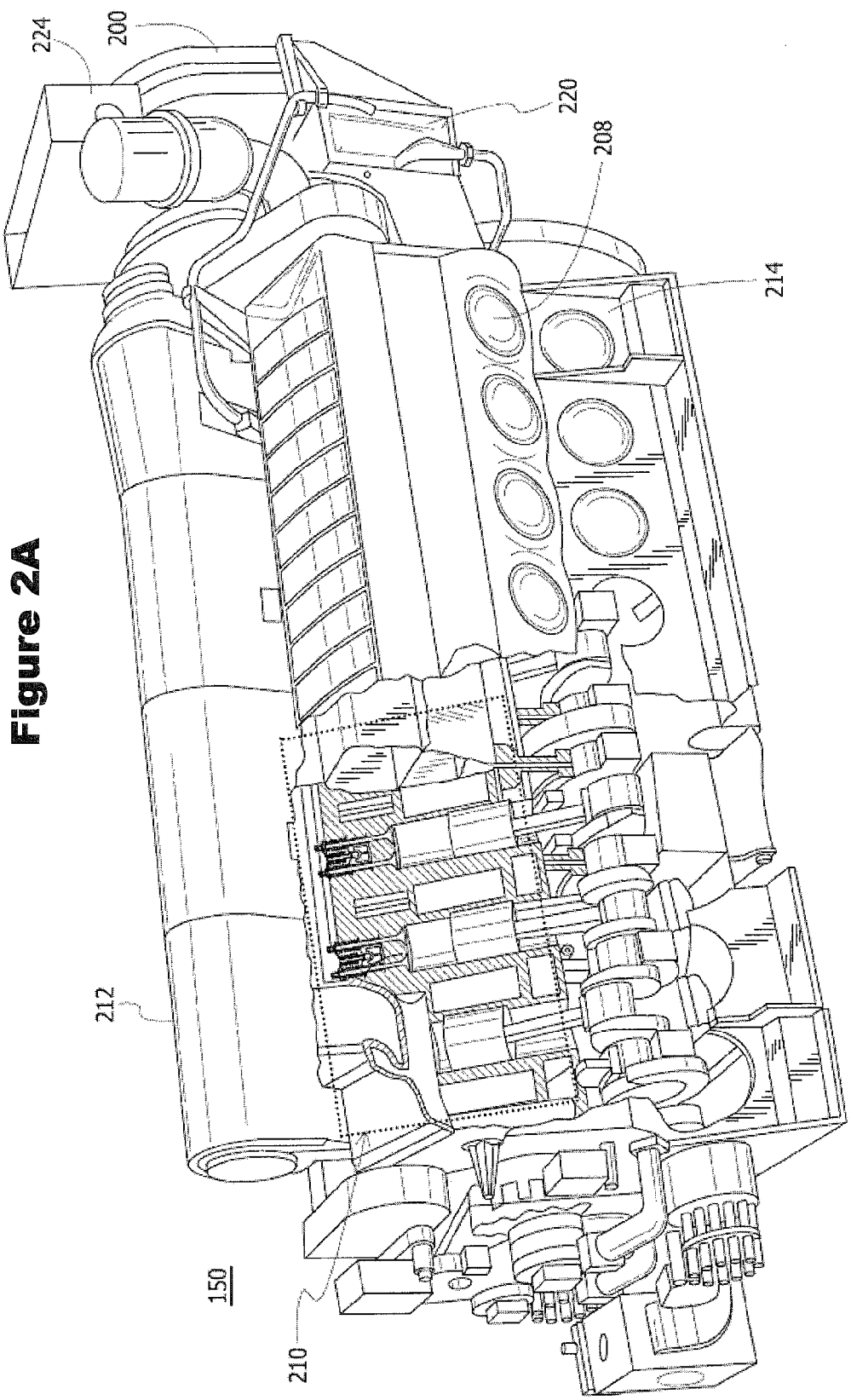
FIG. 2A is a partial cross-sectional perspective view of the two-stroke diesel engine system of FIG. 1.

The present invention EGR system enhances the unique scavenging and mixing processes of a locomotive uniflow two-stroke diesel engine in order to reduce $NO_X$ emissions while achieving desired fuel economy. Further provided is an embodiment that includes various EGR system components, which may be placed within the limited size constraints of the locomotive of FIG. 1 and which are designed for ease of maintainability.

The various embodiments of the present invention provide a system which are able to exceed what is referred in the industry as the Environmental Protection Agency's (EPA) Tier II (40 CFR 92) and Tier III (40 CFR 1033) $NO_X$ emission requirements, as well as the more stringent European Commission (EURO) Tier IIIb $NO_X$ emission requirements. The present invention pressure balanced EGR assembly may further be enhanced by adapting the various engine parameters as well as the EGR system parameters.

As shown in FIG. 3, an EGR system 350 is illustrated which recirculates exhaust gases from the exhaust manifold 312 of the engine 306, mixes the exhaust gases with the cooled charge air of the aftercooler 320, and delivers such to the airbox 308. In this EGR system 350, only a select percentage of the exhaust gases is recirculated and mixed with the intake charge air in order to selectively reduce pollutant emissions (including $NO_X$) while achieving desired fuel efficiency. The percentage of exhaust gases to be recirculated is also dependent on the amount of exhaust gas flow needed for powering the compressor 302 of the turbocharger 300. It is desired that enough exhaust gas powers the turbine 304 of the turbocharger 300 such that an optimal amount of fresh air is transferred to the engine 306 for combustion purposes. For locomotive diesel engine applications, it is desired that less than about 35% of the total gas (including compressed fresh air from the turbocharger and recirculated exhaust gas) delivered to the airbox 308 be recirculated. This arrangement provides for pollutant emissions (including $NO_X$) to be reduced, while achieving desired fuel efficiency.

A flow regulating device may be provided for regulating the amount of exhaust gases to be recirculated. In one embodiment, the flow regulating device is a valve 352 as illustrated in FIG. 3. Alternatively, the flow regulating device may be a positive flow device 360, wherein there is no valve (not shown) or the valve 352 may function as an on/off valve as will be discussed in greater detail below.

The select percentage of exhaust gases to be recirculated may be optionally filtered. Filtration is used to reduce the particulates that will be introduced into engine 306 during recirculation. The introduction of particulates into the engine 306 causes accelerated wear especially in uniflow two-stroke diesel engine applications. If the exhaust gases are not filtered and recirculated into the engine, the unfiltered particulates from the combustion cycle would accelerate wear of the piston rings and cylinder liner. For example, uniflow two-stroke diesel engines are especially sensitive to cylinder liner wall scuffing as hard particulates are dragged along by the piston rings the cylinder liner walls after passing through the intake ports. Oxidation and filtration may also be used to prevent fouling and wear of other EGR system components (e.g., cooler 358 and positive flow device 360) or engine system components. In FIG. 3, a diesel oxidation catalyst (DOC) 354 and a diesel particulate filter (DPF) 356 are provided for filtration purposes. The DOC uses an oxidation process to reduce the particulate matter (PM), hydrocarbons and/or carbon monoxide emissions in the exhaust gases. The DPF includes a filter to reduce PM and/or soot from the exhaust gases. The DOC/DPF arrangement may be adapted to passively regenerate and oxidize soot. Although a DOC 354 and DPF 356 are shown, other comparable filters may be used.

The filtered air is optionally cooled using cooler 358. The cooler 358 serves to decrease the recirculated exhaust gas temperature, thereby providing a denser intake charge to the engine. The decrease in recirculated exhaust gas intake temperature reduces $NO_X$ emissions and improves fuel economy. It is preferable to have cooled exhaust gas as compared to hotter exhaust gas at this point in the EGR system due to ease of deliverability and compatibility with downstream EGR system and engine components.

The cooled exhaust gas flows to a positive flow device 360 which provides for the necessary pressure increase to overcome the pressure loss within the EGR system 350 itself and overcome the adverse pressure gradient between the exhaust manifold 312 and the introduction location of the recirculated exhaust gas. Specifically, the positive flow device 360 increases the static pressure of the recirculated exhaust gas sufficient to introduce the exhaust gas upstream of the power assembly. Alternatively, the positive flow device 360 decreases the static pressure upstream of the power assembly at the introduction location sufficient to force a positive static pressure gradient between the exhaust manifold and the introduction location upstream of the power assembly 310. The positive flow device 360 may be in the form of a roots blower, a venturi, centrifugal compressor, propeller, turbocharger, pump or the like. The positive flow device 360 may be internally sealed such that oil does not contaminate the exhaust gas to be recirculated.

As shown in FIG. 3, there is a positive pressure gradient between the airbox 308 (e.g., about 94.39 in Hga) to the exhaust manifold 312 (e.g., about 85.46 in Hga) necessary to attain the necessary levels of cylinder scavenging and mixing. In order to recirculate exhaust gas, the recirculated exhaust gas pressure is increased to at least match the aftercooler discharge pressure as well as overcome additional pressure drops through the EGR system 350. Accordingly, the exhaust gas is compressed by the positive flow device 360 and mixed with fresh air from the aftercooler 320 in order to reduce $NO_X$ emissions while achieving desired fuel economy. It is preferable that the introduction of the exhaust gas is performed in a manner which promotes mixing of recirculated exhaust gas and fresh air.

As an alternative to the valve 352 regulating the amount of exhaust gas to be recirculated as discussed above, a positive flow device 360 may instead be used to regulate the amount of exhaust gas to be recirculated. For example, the positive flow device 360 may be adapted to control the recirculation flow rate of exhaust gas air from the engine 306, through the EGR system 350, and back into the engine 306. In another example, the valve 352 may function as an on/off type valve, wherein the positive flow device 360 regulates the recirculation flow rate by adapting the circulation speed of the device. In this arrangement, by varying the speed of the positive flow device 360, a varying amount of exhaust gas may be recirculated. In yet another example, the positive flow device 360 is a positive displacement pump (e.g., a roots blower) which regulates the recirculation flow rate by adjusting its speed.

A new turbocharger 300 is provided having a higher pressure ratio than that of the prior art uniflow two-stroke diesel engine turbochargers. The new turbocharger provides for a higher compressed charge of fresh air, which is mixed with the recirculated exhaust gas from the positive flow device 360. The high pressure mixture of fresh air and exhaust gas delivered to the engine 306 provides the desired trapped mass of oxygen necessary for combustion given the low oxygen concentration of the trapped mixture of fresh air and cooled exhaust gas.

Figure 4:
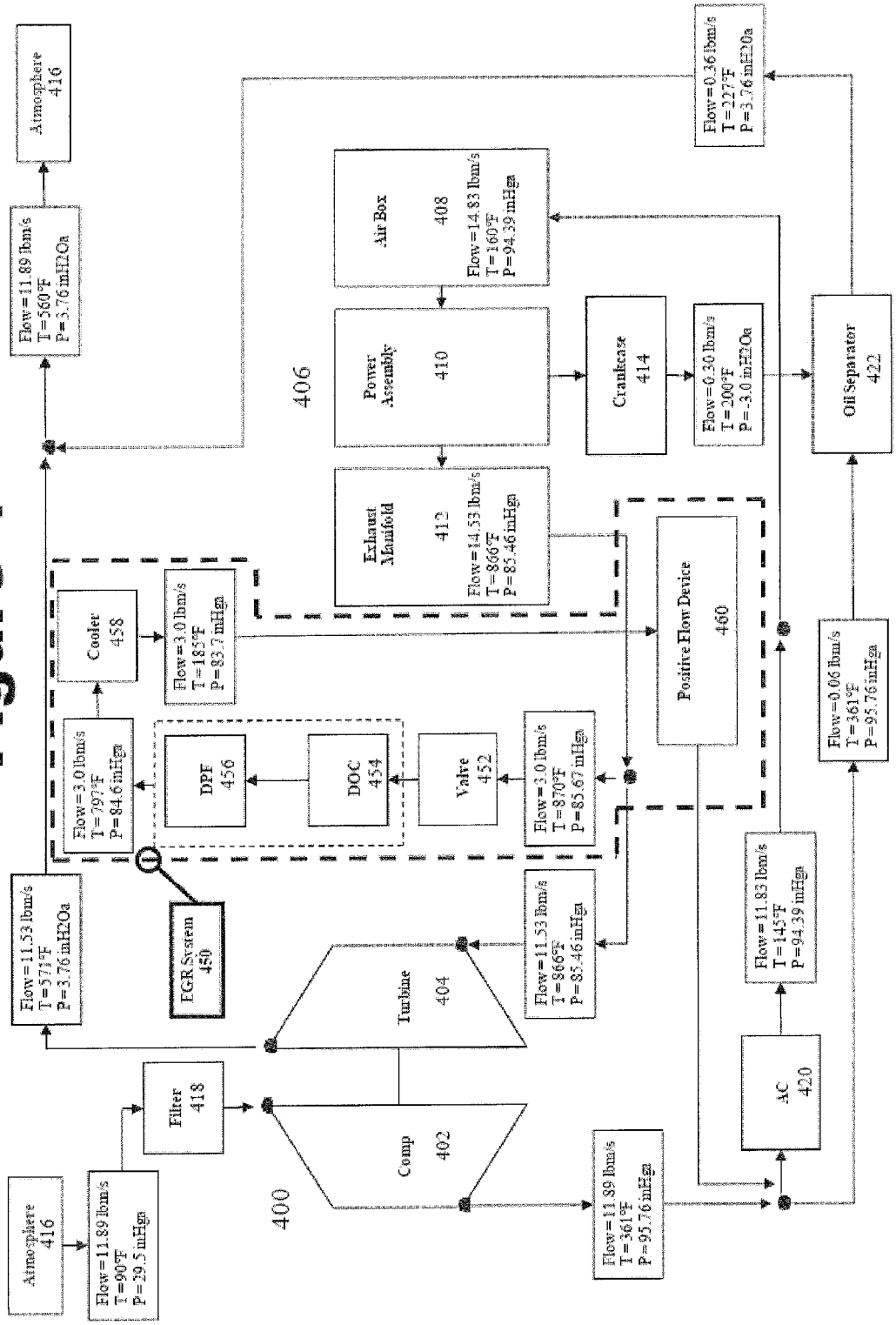
FIG. 4 is a system diagram of the two-stroke diesel engine system having an EGR system in accordance with another embodiment of the present invention.

As shown in an EGR system 450 embodiment of FIG. 4, recirculated exhaust gas may be alternatively introduced upstream of the aftercooler 420 and cooled thereby before being directed to the airbox 408 of the engine 406. In this embodiment, the aftercooler 420 (in addition to the cooler 458) cools the fresh charge air from the turbocharger 400 and the recirculated exhaust gas to decrease the overall charge air intake temperature of the engine 406, thereby providing a denser intake charge air to the engine 406. In another embodiment (not shown), an optional oil filter may be situated downstream of the positive flow device 460 to filter any residual oil therefrom. This arrangement prevents oil contamination in the aftercooler 420 and in the recirculated exhaust gas.

Figure 5:
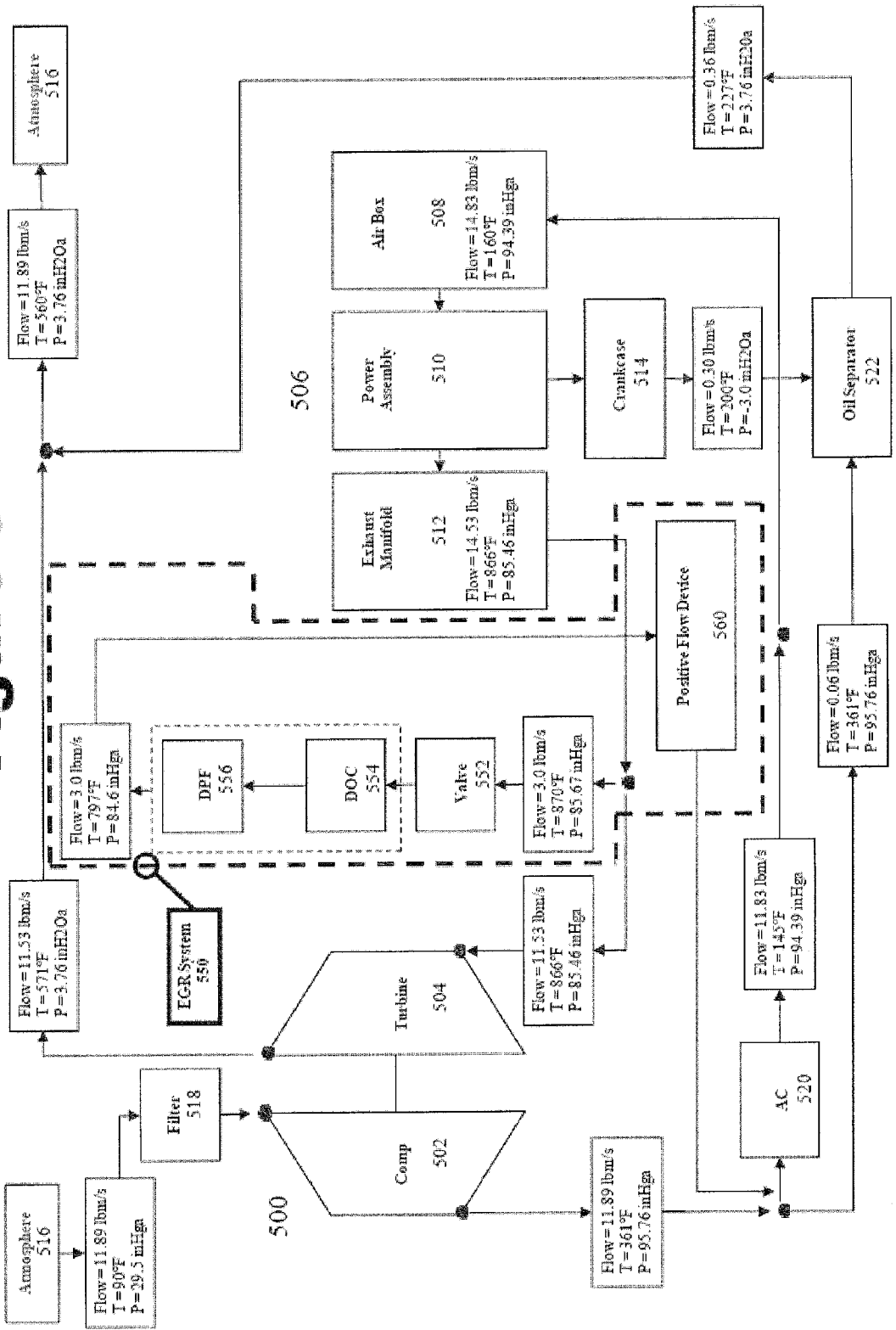
FIG. 5 is a system diagram of the two-stroke diesel engine system having an EGR system in accordance with another embodiment of the present invention.

As shown in an EGR system 550 embodiment of FIG. 5, the filtered air may optionally be directed to the aftercooler 520 for the same purposes without the addition of the cooler 358, 458 in FIGS. 3 and 4. In this arrangement, the cooling of the exhaust gas to be recirculated is performed solely by the aftercooler 520. The aftercooler 520 would serve to cool the fresh charge air from the turbocharger and the recirculated exhaust gas, thereby providing a denser overall intake charge air to the engine.

Figure 6:
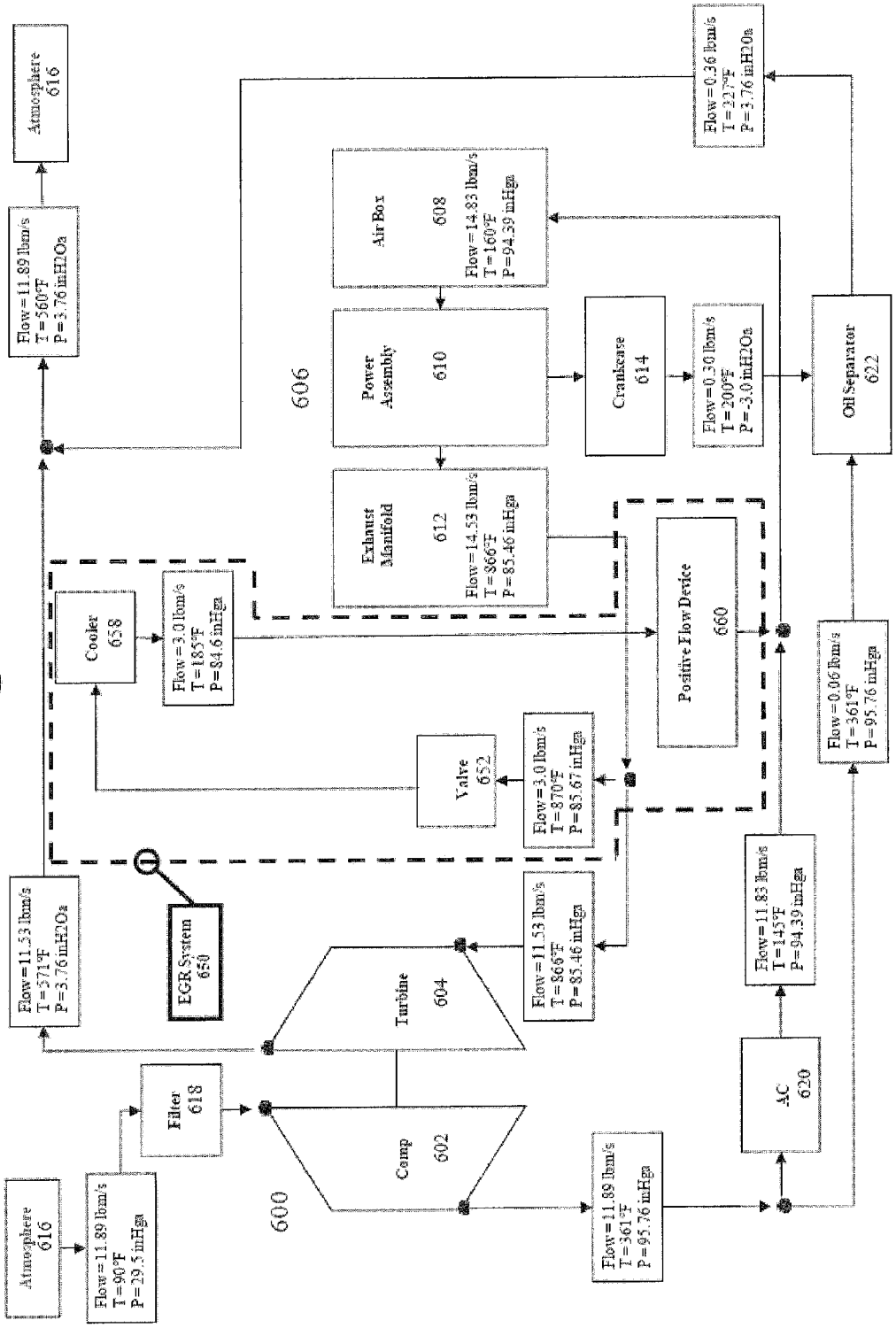
FIG. 6 is a system diagram of the two-stroke diesel engine system having an EGR system in accordance with another embodiment of the present invention.

As shown in FIG. 6, an EGR system 650 is illustrated which does not include the DOC/DPF filtration system of the previous embodiments.

Figure 7:
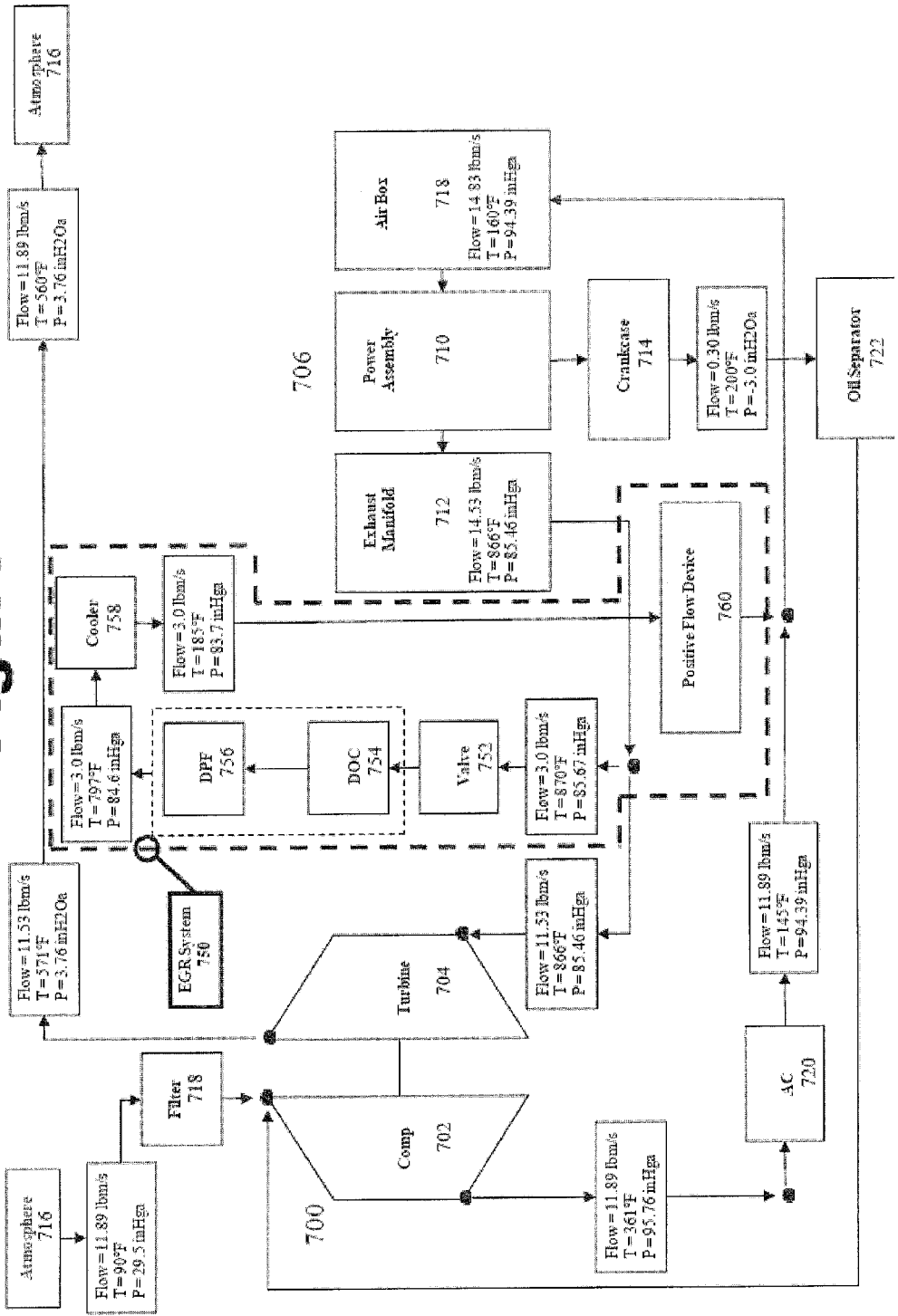
FIG. 7 is a system diagram of the two-stroke diesel engine system having an EGR system in accordance with another embodiment of the present invention.

As shown in FIG. 7, an EGR system 750 is illustrated, which is implemented in an engine 706 having a positive or negative crankcase ventilation, whereby the oil separator outlet is directed to the low pressure region upstream of the compressor inlet. Accordingly, the compressed air from the turbocharger 700 is not directed to an oil separator as shown in the previous embodiments.

A control system may further be provided which monitors and controls select components of any of the EGR systems of the previous embodiments, or other similar EGR systems. Specifically, the control system may be adapted to control select components of an EGR system to adaptively regulate exhaust gas recirculation based on various operating conditions of the locomotive. The control system may be in the form of a locomotive control computer, another onboard control computer or other similar control device. Various embodiments of control systems are illustrated in FIG. 8.

Figure 8:
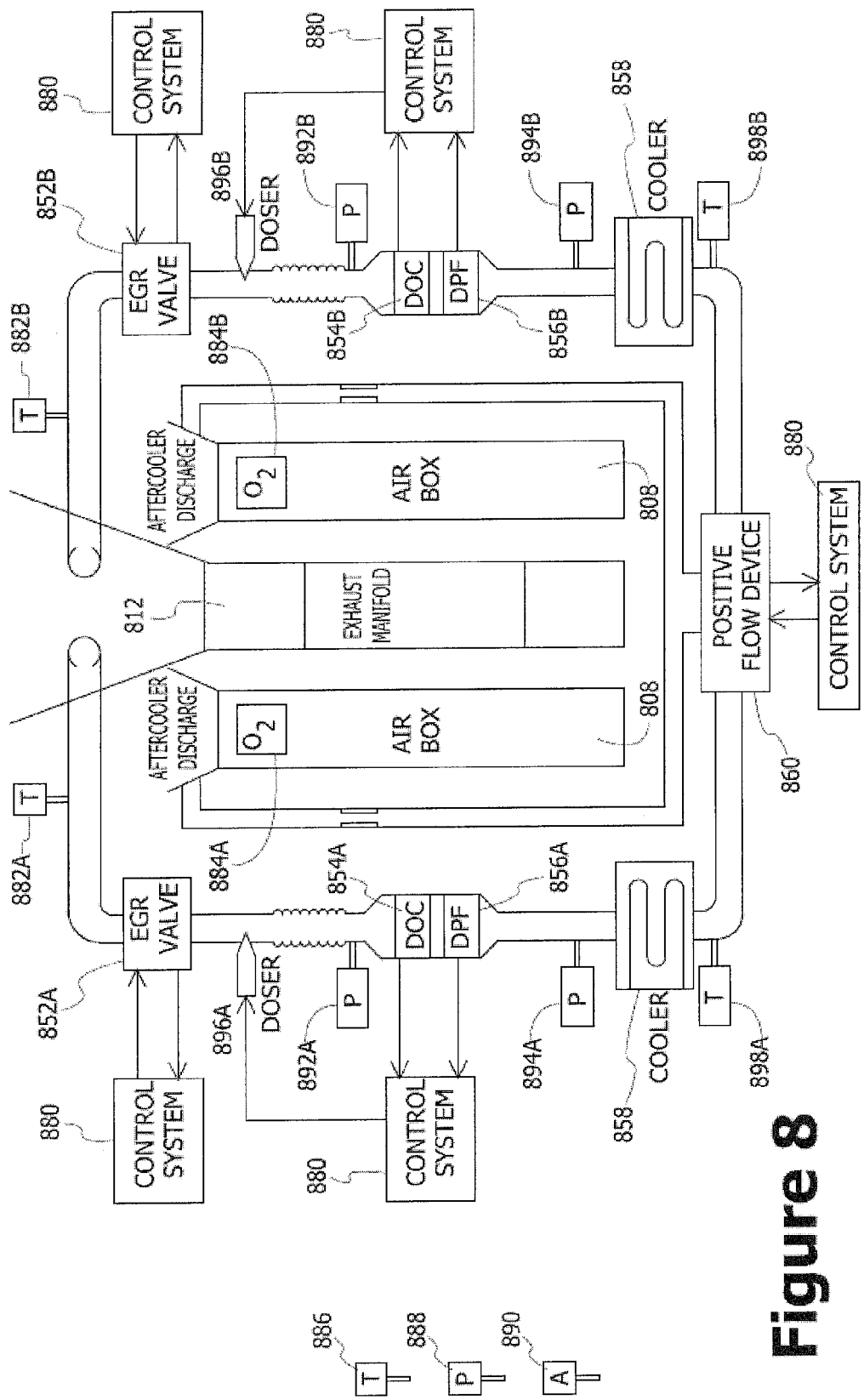
FIG. 8 is a system diagram of a control system for an EGR system for a two-stroke diesel engine in accordance with an embodiment of the present invention.
Figure 9A:
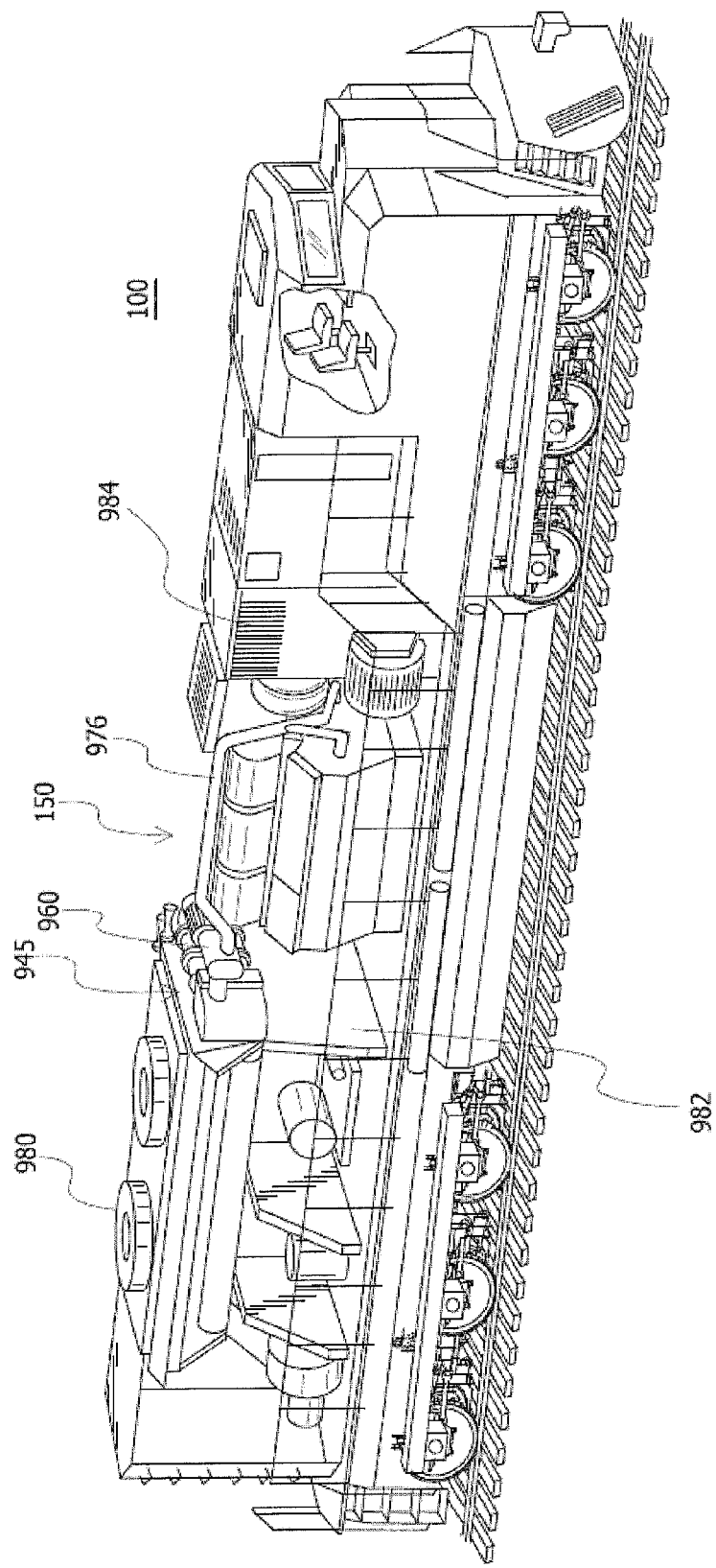
FIG. 9A is a perspective view of a locomotive including a two-stroke diesel engine system with an EGR system in accordance with an embodiment of the present invention.
Figure 9C:
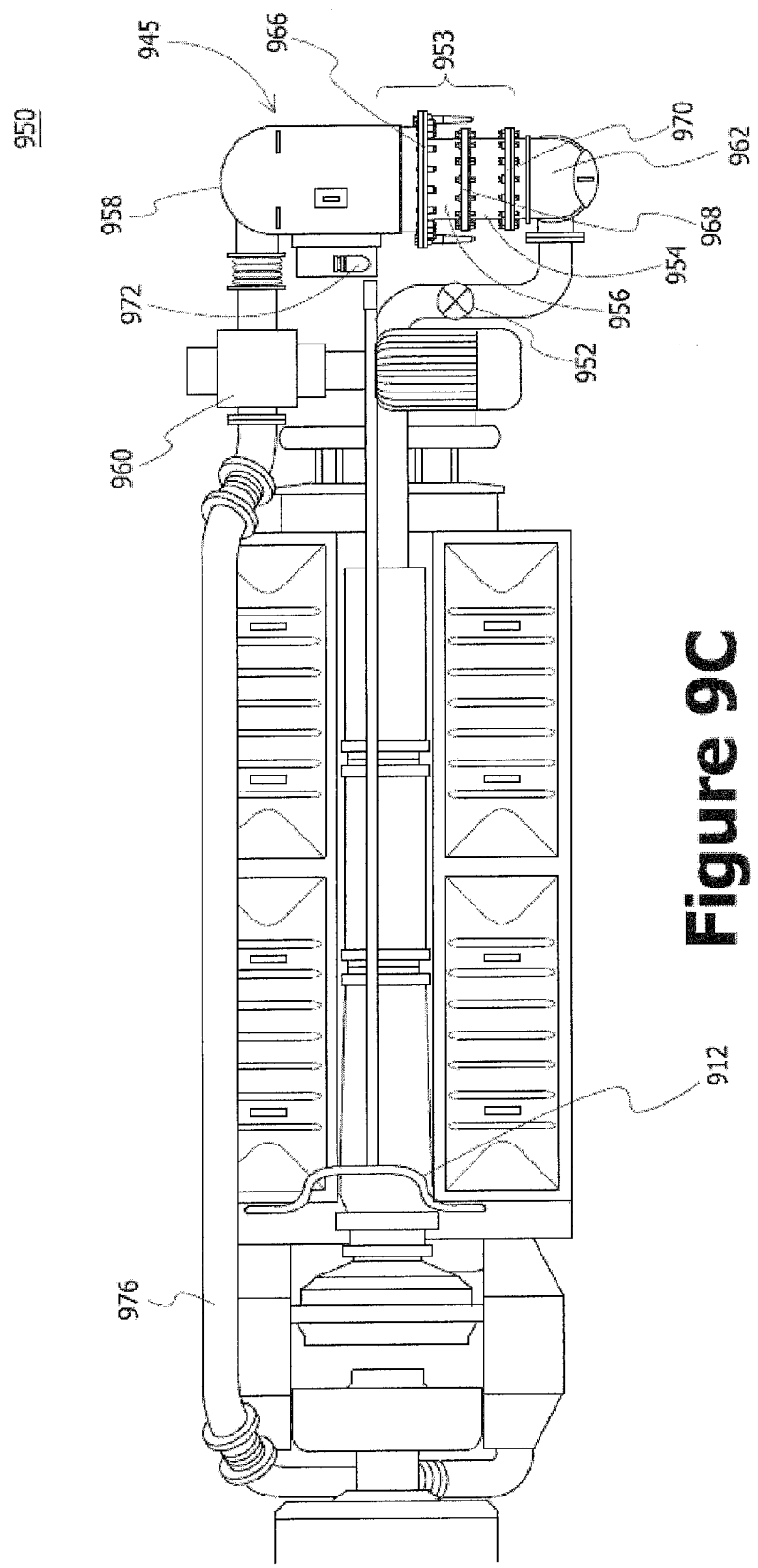
FIG. 9C is a top view of the two-stroke diesel engine system with an EGR system of FIG. 9A.
Figure 9D:
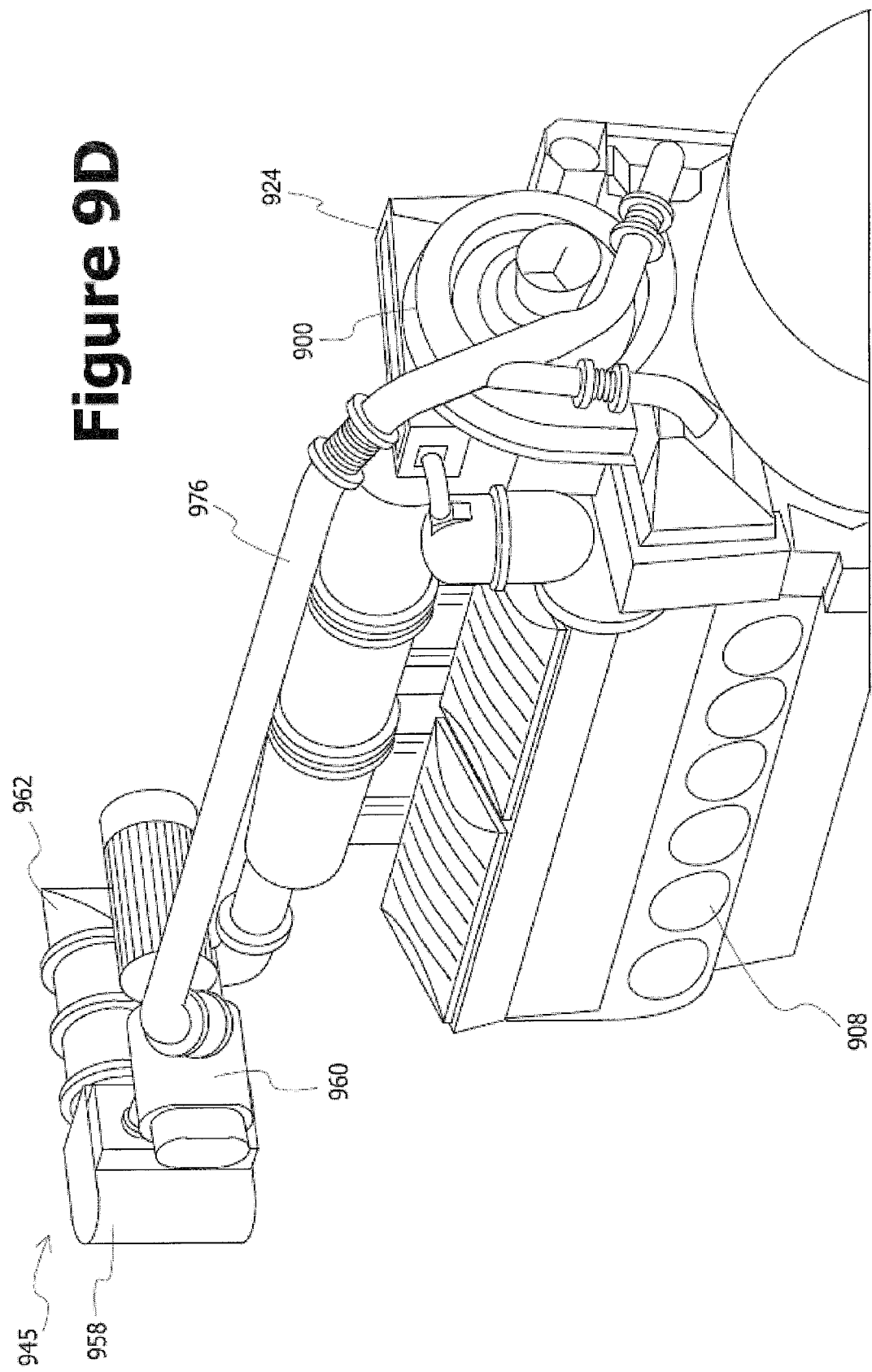
FIG. 9D is a side view of the two-stroke diesel engine system with an EGR system of FIG. 9A, showing ducts for introducing the recirculated exhaust gas into the engine.
Figure 9E:
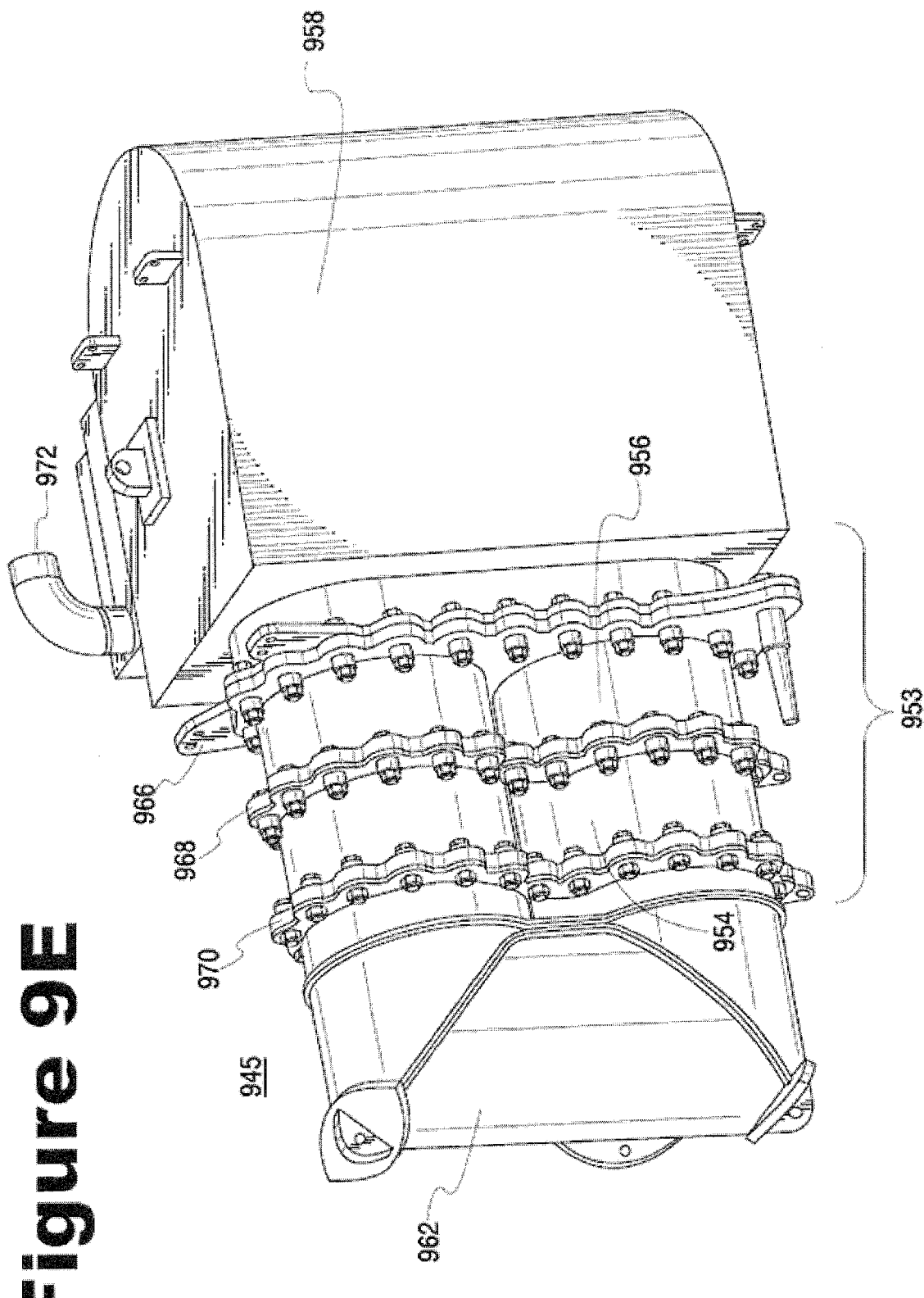
FIG. 9E is a perspective view of an embodiment of an EGR module for use with the EGR system of FIG. 9A.
Figure 9G:
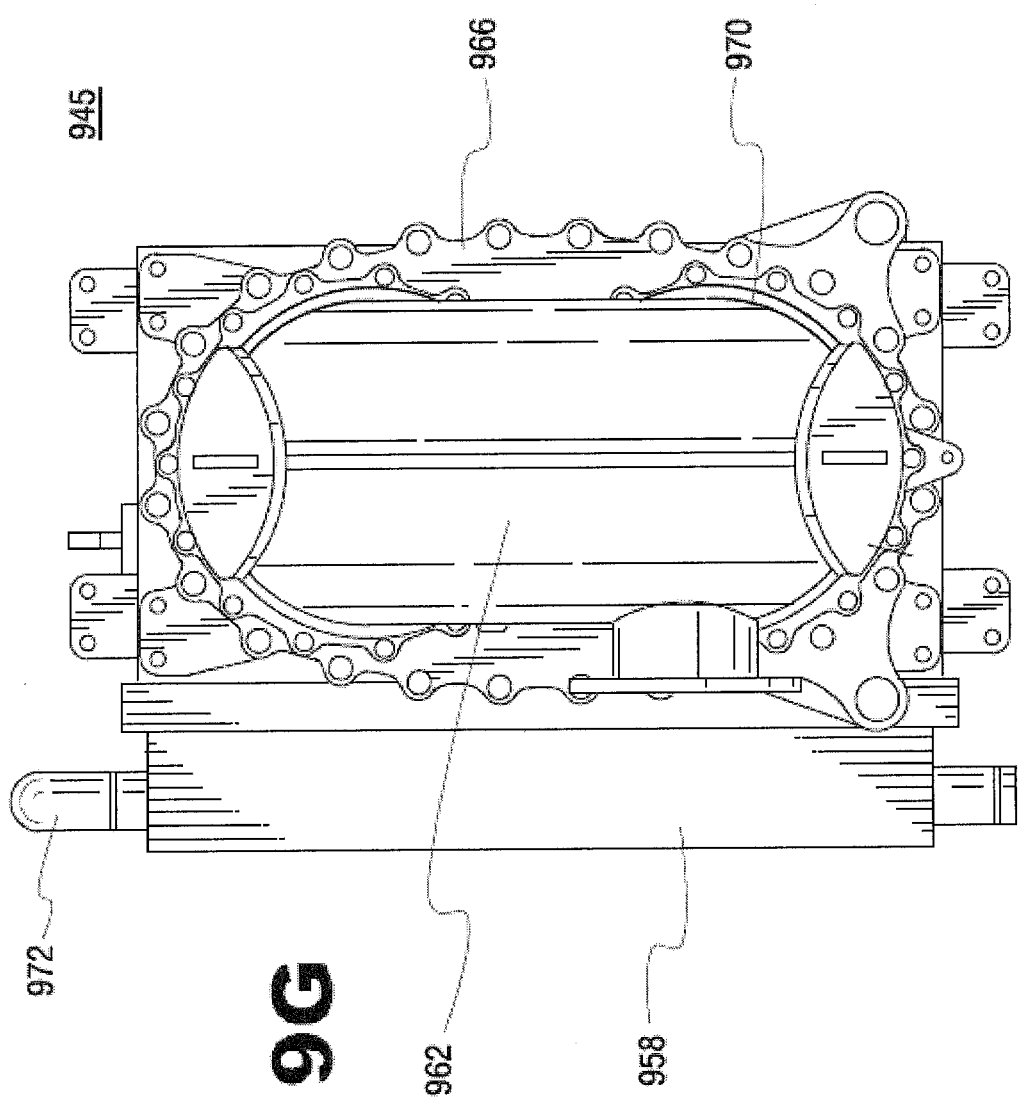
FIG. 9G is a front side view of the EGR module of FIG. 9E
Figure 9H:
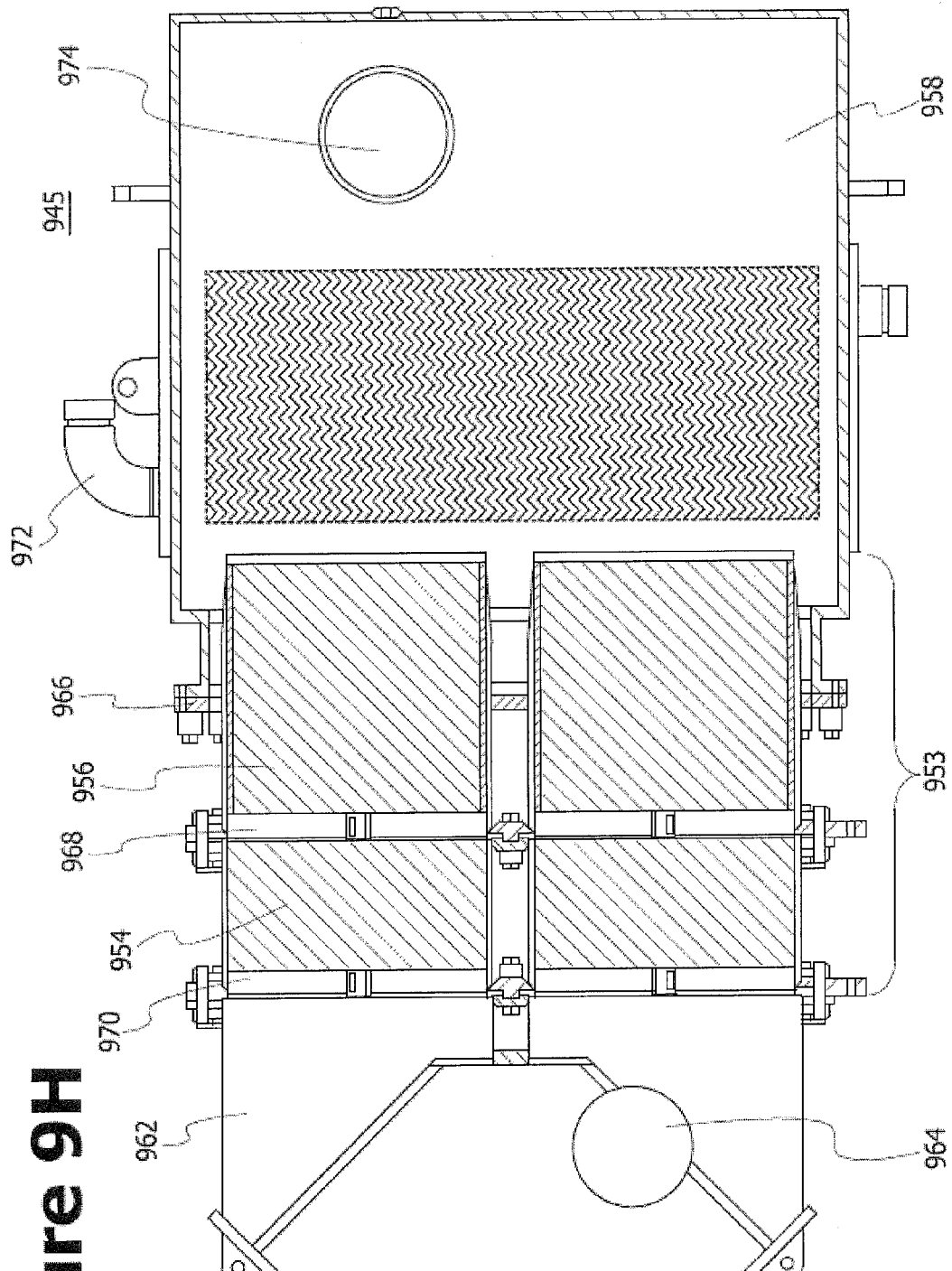
FIG. 9H is a cross sectional view of the EGR module of FIG. 9E

In one embodiment of FIG. 8, a control system 880 monitors the temperature of the exhaust gas at the exhaust manifold using exhaust manifold temperature sensors 882a, 882b. If the exhaust gas temperature at the exhaust manifold 812 is within the normal operational temperature range of the EGR system, the control system signals the flow regulating device (e.g., valve 852a and 852b and/or positive flow device 860) to recirculate a select amount of exhaust gas through the engine. If the exhaust gas temperature falls outside of the normal operational temperature range of the EGR system, the control system 880 signals the flow regulating device (e.g., valve 852a, 852b and/or positive flow device 860) to recirculate another select amount of exhaust gas through the engine. It is preferable that if the exhaust gas temperature falls outside of the normal operational temperature range of the EGR system, the control system 880 signals the flow regulating device to lower the amount of exhaust to be recirculated through the engine. In one example, the normal operational temperature range of the EGR system is based in part on the operating temperature limits of the diesel engine. In another example, the normal operational temperature range of the EGR system is based in part on the temperatures at which the DPF 856a, 856b will passively regenerate. The control system may further be adapted to signal the flow regulating device to recirculate a select amount of exhaust gas through the engine system based in part on the operational condition of the diesel engine system within a tunnel. In one example, the normal operational temperature range of the EGR system is based in part on the operation of the locomotive in a tunnel.

In another embodiment, a control system 880 monitors the oxygen concentration in the airbox or, alternatively, the exhaust gas oxygen concentration at the exhaust manifold using oxygen concentration sensors 884a, 884b. The control system 880 signals the flow regulating device (e.g., valve 852a, 852b and/or positive flow device 860) to recirculate a select amount of exhaust gas through the engine based on levels of oxygen concentration. In one example, if there is a high oxygen concentration, the control system 880 may be adapted to signal the flow regulating device to increase the amount of exhaust gas to be recirculated through the engine.

In yet another embodiment, a control system 880 monitors ambient temperature using an ambient temperature sensor 886. The control system 880 signals the flow regulating device (e.g., valve 852a, 852b and/or positive flow device 860) to recirculate a select amount of exhaust gas through the engine based on ambient temperature. In one example, if the ambient temperature is lower than a select temperature, the control system 880 may be adapted to signal the flow regulating device to increase the amount of exhaust gas to be recirculated through the engine to at least offset the higher levels of oxygen concentration in the recirculated exhaust gas at lower ambient temperatures.

In yet another embodiment, a control system 880 monitors ambient barometric pressure or altitude using an ambient barometric pressure sensor 888 or an altitude measurement device 890. The control system 880 signals the flow regulating device (e.g., valve 852a, 852b and/or positive flow device 860) to recirculate a select amount of exhaust gas through the engine based on ambient barometric pressure or altitude. In one example, if the barometric pressure is lower than a select value, the control system 880 may be adapted to signal the flow regulating device to decrease the amount of exhaust gas to be recirculated through the engine because there are lower levels of oxygen concentration in the recirculated exhaust gas at lower barometric pressures. Alternatively, if the altitude is lower than a select value, the control system 880 may be adapted to signal the flow regulating device to increase the amount of exhaust gas to be recirculated through the engine because there are higher levels of oxygen concentration in the recirculated exhaust gas at lower altitudes.

In another embodiment, a control system 880 determines and monitors the pressure differential across the DOC/DPF arrangement 854a, 856a, 854b, 856b using pressure sensors 892a, 892b, 894a, 894b. As discussed above, the DOC/DPF arrangement 854a, 856a, 854b, 856b may be adapted to passively regenerate and oxidize soot within the DPF 856a, 856b. However, the DPF 856a, 856b will accumulate ash and some soot, which must be removed in order to maintain the DPF efficiency. As ash and soot accumulate, the pressure differential across the DOC/DPF arrangement 854a, 856a, 854b, 856b increases. Accordingly, the control system 880 monitors and determines whether the DOC/DPF arrangement 854a, 856a, 854b, 856b has reached a select pressure differential at which the DPF 856a, 856b requires cleaning or replacement. In response thereto, the control system 880 may signal an indication that the DPF 856a, 856b requires cleaning or replacement. Alternatively, the control system 880 may signal the flow regulating device to lower recirculation of exhaust gas through the engine. In another embodiment, a control system 880 is shown to be coupled to a doser 896a, 896b, which adds fuel onto the catalyst for the DOC/DPF arrangement 854a, 856a, 854b, 856b for active regeneration of the filter. The fuel reacts with oxygen in the presence of the catalyst which increases the temperature of the recirculated exhaust gas to promote oxidation of soot on the filter. In another embodiment (not shown), the control system may be coupled to a burner, heating element or other heating device for controlling the temperature of the recirculated exhaust gas to control oxidation of soot on the filter.

In yet another embodiment, a control system 880 measures the temperature of the exhaust gas downstream of the cooler 858 or the temperature of the coolant in the cooler 858. As shown in FIG. 8, temperature sensors 898a, 898b are provided for measuring exhaust gas temperature downstream of the cooler 858. If the exhaust gas temperature downstream of the cooler 858 or the coolant temperature is within a select temperature range, the control system 880 signals the flow regulating device (e.g., valve 852a, 852b and/or positive flow device 860) to recirculate a select amount of exhaust gas through the engine. If the exhaust gas temperature downstream of the cooler 858 or the coolant temperature falls outside of a select temperature range, the control system 880 signals the flow regulating device to recirculate another select amount of exhaust gas through the engine. In one example, the control system 880 may be adapted to monitor the coolant temperature to determine whether the conditions for condensation of the recirculated exhaust gas are present. If condensation forms, acid condensate may be introduced into the engine system. Accordingly, the control system 880 may be adapted to signal the flow regulating device to lower recirculation of exhaust gas through the engine until the conditions for condensation are no longer present.

In another embodiment, a control system 880 may be adapted to adaptively regulate flow based on the various discrete throttle positions of the locomotive in order to maximize fuel economy, reduce $NO_X$ emissions even further and maintain durability of the EGR system and engine components. For example, the control system 880 may signal the flow regulating device (e.g., valve 852a, 852b and/or positive flow device 860) to lower recirculation of exhaust gas through the engine at low idle, high idle, throttle position 1, throttle position 2 or upon application of dynamic brake. The control system 880 may be adapted to signal the flow regulating device to recirculate exhaust gas through the engine at or above throttle position 3. In one example, the control system 880 may be adapted to increase the amount of exhaust gas to be recirculated through the engine with an increase of throttle position. In yet another embodiment, the control system 880 may be adapted to increase the amount of exhaust gas to be recirculated with additional engine load. Likewise, the control system 880 may be adapted to decrease the amount of exhaust gas to be recirculated with a decreased engine load.

FIGS. 9a-h illustrate an embodiment of an EGR system 950 in accordance with the system outlined in FIG. 4 for use with a two-stroke, 12-cylinder diesel engine system 150 in a locomotive 100. The EGR system 950 is sized and shaped to fit within limited length, width, and height constraints of a locomotive 100. As shown herein, the EGR system 950 is installed within the same general framework of traditional modern diesel engine locomotives. Specifically, the EGR system 950 is generally located in the limited space available between the exhaust manifold 912 of a locomotive engine and the locomotive radiators 980. In this embodiment, the EGR system 950 is shown located generally above the general location of the equipment rack 982. Also, a 12-cylinder locomotive diesel engine may be used instead of a 16-cylinder locomotive diesel engine in order to provide for more space. In an alternative embodiment (not shown), the EGR system 950 may be housed in the locomotive body near the inertial filter.

Generally, the EGR system 950 includes a DOC, DPF and cooler, which are packaged in an integrated EGR module 945. The EGR system 950 further includes a positive flow device 960 interconnected with the EGR module 945. The EGR system 950 receives exhaust gases from the exhaust manifold 912 of the engine 906. A valve 952 is provided between the exhaust manifold 912 and the integrated EGR module 945. The EGR module 945 processes the exhaust gases therein. The positive flow device 960 compresses the processed exhaust gas to be recirculated and introduces such upstream of the aftercooler 920 by mixing the recirculated exhaust gases with the fresh charge air from the turbocharger 900, and delivers the mixture of fresh charge air and recirculated exhaust gas to the airbox 908, as fully discussed with respect to the embodiment of FIG. 4. In this system, only a select percentage of the exhaust gases is recirculated and mixed with the intake charge air in order to selectively reduce pollutant emissions (including $NO_X$) while achieving desired fuel efficiency. Although the EGR system 950 is an implementation of the system embodiment of FIG. 4, it may be adapted to be an implementation of any of the other previous EGR system embodiments discussed herein. For example, instead of introducing the recirculated exhaust gas upstream of the aftercooler, as described with respect to the embodiments of FIGS. 4 and 9, the recirculated exhaust gas may be introduced downstream of the aftercooler as discussed with respect to FIG. 3.

The integrated EGR module 945 includes a section 962 having an inlet 964 for receiving exhaust gases from the exhaust manifold. Specifically, the inlet section 962 of the EGR module 945 is interconnected with the exhaust manifold 912 of the engine 906. A valve 952 is provided between the exhaust manifold 912 and the inlet section 962 of the EGR module 945. In one example, the valve 952 is adaptable for determining the amount of exhaust gases to be recirculated through the engine 906. In another example, the valve 953 may act as an on/off valve for determining whether gases are to be recirculated through the engine 906.

Having received exhaust gas, the inlet section 962 of the EGR module 945 directs exhaust gases into a section which houses at least one diesel oxidation catalyst/diesel particulate filter (DOC/DPF) arrangement 953. Each DOC 954 uses an oxidation process to reduce the particulate matter, hydrocarbons and carbon monoxide emissions in the exhaust gases. Each DPF 956 includes a filter to reduce diesel particulate matter (PM) or soot from the exhaust gases. Oxidation and filtration is specifically used in this embodiment to reduce the particulate matter that will be introduced into engine 906 during recirculation. The introduction of particulates into the engine 906 causes accelerated wear especially in uniflow two-stroke diesel engine applications. Oxidation and filtration may also be used to prevent fouling and wear of other EGR system components (e.g., cooler 958 and positive flow device 960) or engine system components.

The DOC/DPF arrangement 953 is designed, sized and shaped such that they effectively reduce particulate matter under the operating parameters of the EGR system 950, fit within the limited size constraints of the locomotive 100, have a reasonable pressure drop across their substrates, and have a manageable service interval.

It is desirable that the DOC/DPF arrangement 953 reduces the PM in the exhaust gas by over 90% under the operating parameters of the EGR system 950. Specifically, the composition of the substrates and coatings thereon are chosen of the DOC/DPF arrangement 953 to efficiently reduce particulate matter. In one example of a 12-cylinder uniflow scavenged two-stroke diesel engine at about 3200 bhp with less than 20% exhaust gas being recirculated at full load, the DOC/DPF arrangement 953 is selected to manage and operate a mass flow of exhaust gas of from about 1.5 to about 2.5 lbm/s, having an intake temperature ranging from about 600° F. to about 1050° F., and an intake pressure of about 80 in Hga to about 110 in Hga. It is further preferable that the DOC/DPF arrangement 953 can handle a volumetric flow rate across both the DOC/DPF from about 1000 CFM to about 1300 CFM. Furthermore, the DOC/DPF arrangement 953 is further designed to endure an ambient temperature range of about −40° C. to about 125° C.

The DOC/DPF arrangement 953 is generally packaged such that it fits within the size constraints of the locomotive 100. As shown in this embodiment, each DOC 954 and DPF 956 is packaged in a cylindrical housing similar to those commonly used in the trucking industry. Each DOC 954 and DPF 956 has a diameter of about 12 inches. The length of each DOC 954 is about 6 inches, whereas the length of each DPF 956 is about 13 inches. The DOC 954 and DPF 946 are integrated within the EGR module 945 such that they are able to fit within the size constraints of the locomotive.

It is further desirable that the DOC/DPF arrangement 953 is selected to have a reasonable pressure drop across their substrates. As discussed above, it is preferable that the exhaust gas is introduced into a region of higher pressure. Accordingly, it is desirable to minimize the pressure drop across the DOC/DPF arrangement 953. In one embodiment, it is desirable for the pressure drop across both substrates to be less than about 20 in $H_2O$.

Finally, it is desirable that the DOC/DPF arrangement 953 has a manageable service life. The DOC/DPF arrangement 953 accumulates ash and some soot, which is preferably discarded in order to maintain the efficiency of the DOC 954 and the DPF 956. In one example, the service interval for cleaning of the DOC/DPF arrangement 953 may be selected at about 6 months. As shown in the embodiments, each DOC 954 and DPF 956 are housed in separate but adjoining sections of the EGR module 945 such that they are removable for cleaning and replacement. For maintenance, the DOC/DPF arrangement 953 includes a flange 966 for mounting the DOC/DPF arrangement 953 together with the inlet section 962 of the EGR module 945 to the cooler 958. The fasteners associated with the mounting flange 966 of the DOC/DPF arrangement 953 may be removed such that the DOC/DPF arrangement 953 together with the inlet section 962 of the EGR module 945 may be removed from the cooler 958 and the locomotive. Thereafter, the inlet section 962, the DOC 954, and the DPF 956 may be selectively disassembled for service via flanges 968, 970. In order to facilitate serviceability, the fasteners for flanges 968, 970 are offset from the DOC/DPF arrangement 953 mounting flange 966. Accordingly, the DOC/DPF arrangement 953 together with the inlet section 962 may be removed via its mounting flange 966 without first disassembling each individual section.

In order to meet the operational and maintainability requirements of the EGR system 950, a plurality of DOCs and DPFs are paired in parallel paths. For example, as shown, two DOC/DPC arrangement pairs are shown in parallel in this embodiment in order to accommodate the flow and pressure drop requirements of the EGR system 950. Moreover, the DOC/DPF arrangement pairs in parallel provide for reasonable room for accumulation of ash and soot therein. Nevertheless, more or less DOC/DPF arrangement pairs may be placed in a similar parallel arrangement in order to meet the operational and maintainability requirements of the EGR system 950.

The integrated EGR module 945 further includes a cooler 958 interconnected to the DOC/DPF arrangement 953. The cooler 958 decreases the filtered exhaust gas temperature, thereby providing a denser intake charge to the engine 906. In one example of a cooler 958 for a 12-cylinder uniflow scavenged two-stroke diesel engine at about 3200 bhp with less than 20% exhaust gas being recirculated at full load, each DPF 956 extends into the cooler 958 and provides filtered exhaust gas at a mass flow of about 1.5 lbm/s to about 2.5 lbm/s; a pressure of about 82 in Hga to about 110 in Hga; and a density of about 0.075 $lbm/ft^3$ to about 0.15 $lbm/ft^3$. It is desirable that the cooler 958 reduces the temperature of the filtered exhaust gas from a range of about 600° F.-1250° F. to a range of about 200° F.-250° F. at a inlet volumetric flow rate of about 1050 CFM to about 1300 CFM. The source of the coolant for the cooler 958 may be the water jacket loop of the engine, having a coolant flow rate of about 160 gpm to about 190 gpm via coolant inlet 972. It is further desirable that the cooler 958 maintains a reasonable pressure drop therein. As discussed above, the exhaust gas is introduced into a region of higher pressure. Accordingly, it is desirable to minimize the pressure drop within the cooler 958. In one embodiment, it is desirable for the pressure drop across the cooler to be from about 3 in $H_2O$ to about 6 in $H_2O$.

The cooler 958 is generally packaged such that it fits within the size constraints of the locomotive 100. As shown in this embodiment, the cooler 958 is integrated with the DOC/DPF arrangement 953. The cooler 958 has a frontal area of about 25 inches by 16 inches, and a depth of about 16 inches.

The EGR module 945 is connected to a positive flow device 960 via the outlet 974 from the cooler 958. The positive flow device 960 regulates the amount of cooled, filtered exhaust gas to be recirculated and introduced into the engine 906 at the aftercooler 920 upstream of its core via ducts 976. Specifically, the positive flow device 960 is illustrated as a variable speed roots style blower, which regulates the recirculation flow rate by adapting the circulation speed of the device through its inverter drive system. Specifically, by varying the speed of the positive flow device 960, a varying amount of exhaust gas may be recirculated. Other suitable positive flow devices may be implemented in order to similarly regulate the amount of exhaust gases to be recirculated.

The EGR module may generally be adapted to utilize off-the-shelf components (e.g., DOC and DPF) that are packaged for and commonly used in other exhaust gas emissions reduction applications (e.g., in trucking applications). In these other contrasting applications, the off-the-shelf components are packaged to operate with internal exhaust pressures that are near or about equal to the pressures external to their respective housings. However, in this locomotive, high-pressure loop EGR application (e.g., where the EGR module is situated in and receives high pressure exhaust gas upstream of the turbocharger), the EGR components (e.g., DOC and DPF) must be adapted to operate under an internal exhaust pressure, which is much greater than the internal exhaust pressure in which they traditionally operate.

Figure 10A:
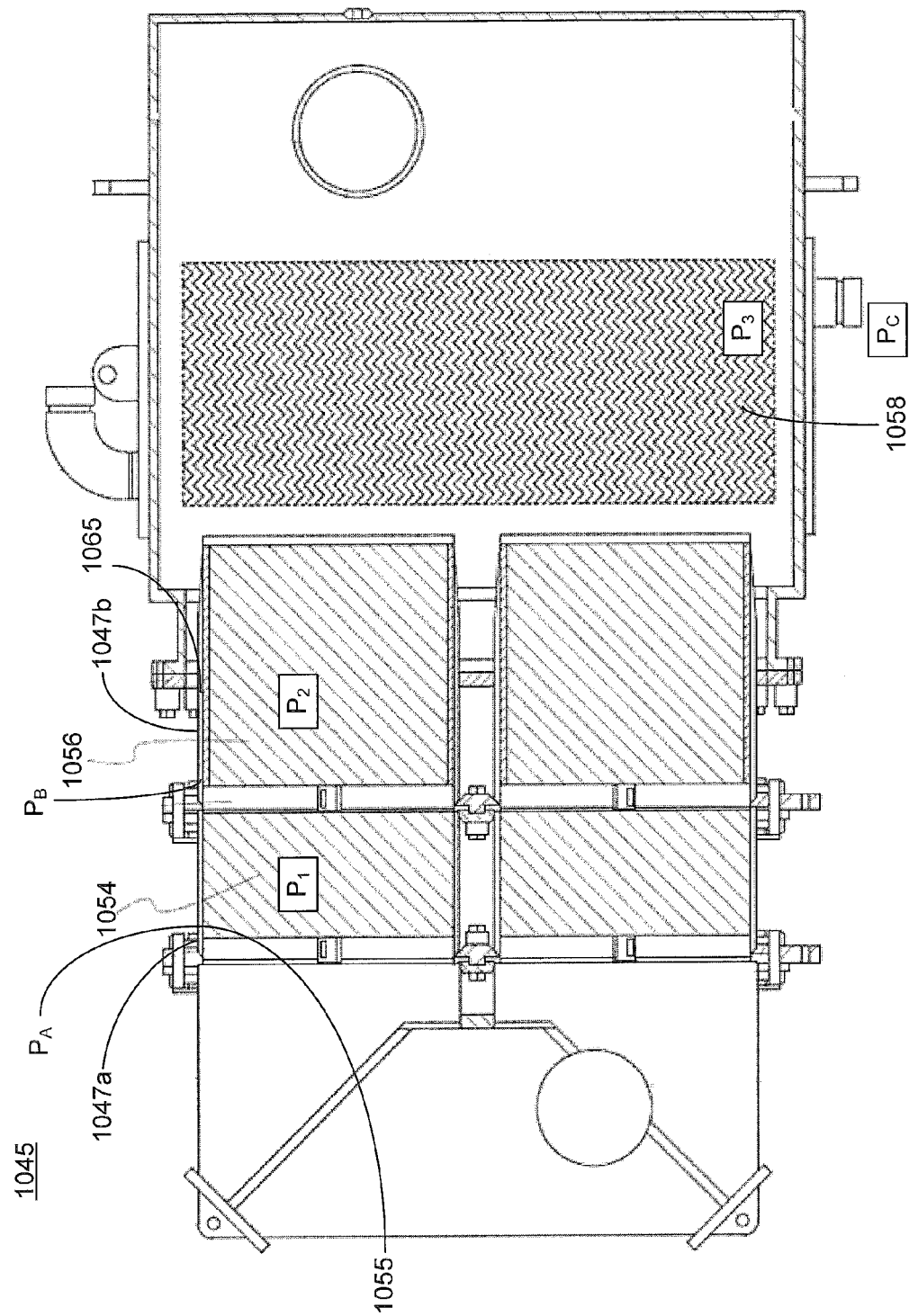
FIG. 10A is sectional view of an alternative embodiment of the present disclosure.

Provided is an embodiment of the present disclosure in which traditional, off-the-shelf EGR components may be utilized without requiring extensive customization of such components (e.g., strengthening of the external housings of each of the EGR components). Specifically, as illustrated in FIG. 10A, the DOC 1054 and DPF 1056 and cooler are housed in separate, but adjoining sections of the EGR module 1045. The arrangement between the housing of the EGR module 1045 and the external housings of each of the DOC 1054 and DPF 1056 stabilizes the pressure differential between the high-pressure exhaust internal to each of the EGR components and the relatively low pressure outside the EGR module 1045.

Figure 10B:
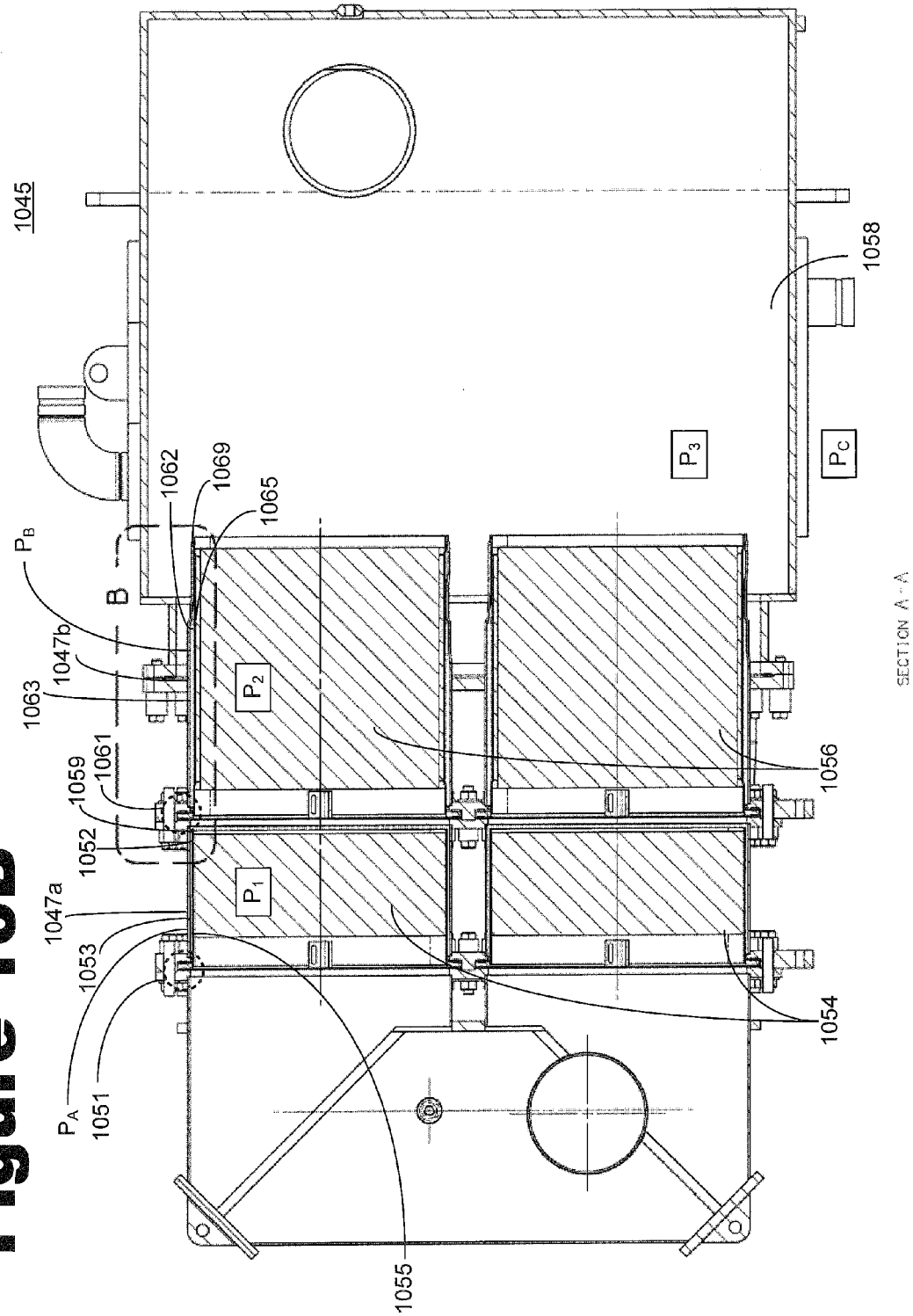
FIG. 10B is sectional view of another alternative embodiment of the present disclosure.

FIGS. 10B and 10C illustrate one embodiment of a pressure balance EGR assembly (Section B). In this embodiment, the housing of the EGR module 1045 defines a space 1053 between the external housing wall 1055 of the DOC 1054 and the inner housing wall 1047a of the EGR module 1045. One side of the space 1053 is confined by a flange-gasket arrangement 1051, whereas the other side 1052 of the space 1053 is in open communication with the outlet of the DOC 1054 such that a portion of exhaust gas fills such. Specifically, exhaust gas flows through the DOC 1054 and a portion of the exhaust gas enters the space 1053 between the external housing wall 1055 of the DOC 1054 and the inner housing wall 1047a of the EGR module at 1059. The portion of exhaust gas fills the space 1053 such that the exhaust gas pressure $P_1$ inside the DOC 1055 and the pressure $P_A$ within the space 1053 are approximately equal.

Similarly, a space 1063 is defined between the external housing wall 1065 of the DPF and the inner housing wall 1047b of the EGR module 1045. One side of the space 1063 is confined by a flange-gasket arrangement 1061, whereas the other side 1062 of the space 1063 is in open communication with the outlet of the DPF 1056 such that a portion of exhaust gas fills such. Specifically, exhaust gas from the DOC 1054 flows through the DPF 1056. A portion of the exhaust gas enters the space 1063 between the external housing wall 1065 of the DPF 1056 and the inner housing wall 1047a of the EGR module 1045 at 1069. The portion of exhaust gas fills the space 1063 such that exhaust pressure $P_2$ inside the DPF 1056 and the pressure $P_B$ within the space 1063 are about equal.

As a result, pressure throughout the EGR module 1045 is balanced and there is no deformation to the external housing of the EGR components (e.g., DOC 1054 and DPF 1056) contained within the EGR module 1045. As such, traditional, off-the-shelf EGR components may be used without customization or strengthening of their respective housings. Moreover, exhaust gas fills each respective space only after being processed by the DOC/DPF 1054/1056 in order to prevent any unprocessed exhaust gas from flowing through the system.

As discussed above, $NO_X$ reduction and achieving desired fuel efficiency is accomplished through the EGR system while maintaining or enhancing the scavenging and mixing processes in a uniflow two-stroke diesel engine. The scavenging and mixing processes may be further enhanced by adjusting the intake port timing, intake port design, exhaust valve design, exhaust valve timing, EGR system design, engine component design and turbocharger design.

The various embodiments of the present invention may be applied to locomotive two-stroke diesel engines may be applied to engines having various numbers of cylinders (e.g., 8 cylinders, 12 cylinders, 16 cylinders, 18 cylinders, 20 cylinders, etc.). The various embodiments may further be applied to other two-stroke uniflow scavenged diesel engine applications other than for locomotive applications (e.g., marine applications).

While this invention has been described with reference to certain illustrative aspects, it will be understood that this description shall not be construed in a limiting sense. For example, the various operating parameters or values described herein exemplify representative values for the present invention system operating under certain conditions. Accordingly, it is expected that these values will change according to different locomotive operating parameters or conditions. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. A pressure balance exhaust gas recirculation (EGR) assembly for a two-stroke uniflow scavenged diesel engine system adapted to reduce NOX emissions and achieve desired fuel economy by recirculating exhaust gas through the engine system, said diesel engine delivering exhaust through an exhaust manifold, said pressure balance EGR assembly comprising:
   an EGR module comprising an inlet section adapted to receive high-pressure exhaust gas from the exhaust manifold of the diesel engine, said EGR module including an EGR module housing having an inner wall and an external wall, wherein the pressure outside the external wall of the EGR module is relatively low as compared to the high-pressure exhaust gas, and
   at least one filtration arrangement housed inside the EGR module, said filtration arrangement including at least one diesel oxidation catalyst (DOC), said filtration arrangement being interconnected with the inlet section of the EGR module via an outlet such that the filtration arrangement receives a portion of the high-pressure exhaust therefrom, said filtration arrangement including a housing for the DOC separate and apart from the EGR module,
   wherein the EGR module housing defines a space between the DOC housing and the inner wall of the EGR module housing for receiving a portion of the exhaust therein, such the pressure of exhaust inside the DOC and the pressure within the space are approximately equal.

2. The pressure balance EGR assembly of claim 1, wherein the space defined between the DOC housing and the inner wall of the EGR module housing has a first side confined by a flange-gasket arrangement and a second side in open communication with the outlet of the filtration arrangement.

3. The pressure balance EGR assembly of claim 1, wherein the filtration arrangement further includes a diesel particulate filter (DPF).

4. The pressure balance EGR assembly of claim 3, wherein the filtration arrangement includes a housing for the DPF separate and apart from the DOC and EGR module.

5. The pressure balance EGR assembly of claim 4, wherein the EGR module housing defines a space between the DPF housing and the inner wall of the EGR module housing for receiving a portion of exhaust therein, such the pressure of exhaust inside the DPF and the pressure within the space between the DPF housing and the EGR module housing are approximately equal.

6. The pressure balance EGR assembly of claim 5, wherein the space defined between the DPF housing and the inner wall of the EGR module housing has a first side confined by a flange-gasket arrangement and a second side in open communication with the outlet of the filtration arrangement.

7. A pressure balance exhaust gas recirculation (EGR) assembly for a two-stroke uniflow scavenged diesel engine system adapted to reduce NOX emissions and achieve desired fuel economy by recirculating exhaust gas through the engine system, said diesel engine delivering exhaust through an exhaust manifold, said pressure balance EGR assembly comprising:
   an EGR module comprising an inlet section adapted to receive high-pressure exhaust gas from the exhaust manifold of the diesel engine, said EGR module including an EGR module housing having an inner wall and an external wall, wherein the pressure outside the external wall of the EGR module is relatively low as compared to the high-pressure exhaust gas, and at least one filtration arrangement housed inside the EGR module, said filtration arrangement including at least one diesel particulate filter (DPF), said filtration arrangement being interconnected with the inlet section of the EGR module via an outlet such that the filtration arrangement receives a portion of high-pressure exhaust therefrom, said filtration arrangement including a housing for the DPF separate and apart from the EGR module, wherein the EGR module housing defines a space between the DPF housing and the inner wall of the EGR module housing for receiving exhaust therein, such the pressure of exhaust inside the DPF and the pressure within the space are approximately equal.

8. The pressure balance EGR assembly of claim 7, wherein the space defined between the DPF housing and the inner wall of the EGR module housing has a first side confined by a flange-gasket arrangement and a second side in open communication with the outlet of the filtration arrangement.

9. The pressure balance EGR assembly of claim 7, wherein the filtration arrangement further includes a diesel oxidation catalyst (DOC).

10. The pressure balance EGR assembly of claim 9, wherein the filtration arrangement includes a housing for the DOC separate and apart from the DPF and EGR module.

11. The pressure balance EGR assembly of claim 10, wherein the EGR module housing defines a space between the DOC housing and the inner wall of the EGR module housing for receiving a portion of the exhaust therein, such the pressure of exhaust inside the DOC and the pressure within the space between the DPF housing and the EGR module housing are approximately equal.

12. The pressure balance EGR assembly of claim 11, wherein the space defined between the DOC housing and the inner wall of the EGR module housing has a first side confined by a flange-gasket arrangement and a second side in open communication with the outlet of the filtration arrangement.

13. A pressure balance exhaust gas recirculation (EGR) assembly for a two-stroke uniflow scavenged diesel engine system adapted to reduce NOX emissions and achieve desired fuel economy by recirculating exhaust gas through the engine system, said diesel engine delivering exhaust through an exhaust manifold, said pressure balance EGR assembly comprising:

an EGR module comprising an inlet section adapted to receive high-pressure exhaust gas from the exhaust manifold of the diesel engine, said EGR module including an EGR module housing having at least one EGR module housing wall having an inner wall and an external wall, wherein the pressure outside the external wall of the EGR module is relatively low as compared to the high-pressure exhaust gas, and at least one filtration arrangement housed inside the EGR module, said filtration arrangement including at least one diesel oxidation catalyst (DOC) and at least one diesel particulate filter (DPF), said filtration arrangement being interconnected with the inlet section of the EGR module via an outlet such that the filtration arrangement receives a portion of the high-pressure exhaust therefrom, said filtration arrangement including a housing for the DOC separate and apart from the EGR module and a housing for the DPF separate and apart from the EGR module and DOC, wherein the EGR module housing defines a space between the DOC housing and the inner wall of the EGR module housing for receiving a portion of the exhaust therein, such the pressure of exhaust inside the DOC and the pressure within the space between the DOC housing and the EGR module housing are approximately equal, and wherein the EGR module housing defines a space between the DPF housing and the inner wall of the EGR module housing for receiving a portion of the exhaust therein, such the pressure of exhaust inside the DPF and the pressure within the space between the DPF housing and the EGR module housing are approximately equal.

14. The pressure balance EGR assembly of claim 13, wherein the space defined between the DOC housing and the inner wall of the EGR module housing has a first side confined by a flange-gasket arrangement and a second side in open communication with the outlet of the filtration arrangement.

15. The pressure balance EGR assembly of claim 13, wherein the space defined between the DPF housing and the EGR module housing has a first side confined by a flange-gasket arrangement and a second side in open communication with the outlet of the filtration arrangement.

* * * * *